US012342872B2

(12) United States Patent
Alarcon et al.

(10) Patent No.: US 12,342,872 B2
(45) Date of Patent: *Jul. 1, 2025

(54) DISABLING CONTROL FOR AN ELECTRONIC SMOKING DEVICE

(71) Applicant: Fontem Ventures B.V., Amsterdam (NL)

(72) Inventors: Ramon Alarcon, Los Gatos, CA (US); Jason Healy, Charlotte, NC (US)

(73) Assignee: Fontem Ventures B.V., Amsterdam (NL)

( * ) Notice: Subject to any disclaimer, the term of this patent is extended or adjusted under 35 U.S.C. 154(b) by 26 days.

This patent is subject to a terminal disclaimer.

(21) Appl. No.: 18/209,282

(22) Filed: Jun. 13, 2023

(65) Prior Publication Data

US 2024/0180260 A1 Jun. 6, 2024

Related U.S. Application Data

(63) Continuation of application No. 16/807,148, filed on Mar. 2, 2020, now Pat. No. 11,712,067, which is a
(Continued)

(51) Int. Cl.
| | |
|---|---|
| A24F 47/00 | (2020.01) |
| A24F 40/485 | (2020.01) |
| A24F 40/50 | (2020.01) |
| A24F 40/51 | (2020.01) |
| A24F 40/65 | (2020.01) |
| A24F 40/90 | (2020.01) |
| A24F 40/95 | (2020.01) |
| B05B 1/30 | (2006.01) |
| H02J 7/00 | (2006.01) |

(Continued)

(52) U.S. Cl.
CPC ............ *A24F 40/95* (2020.01); *A24F 40/485* (2020.01); *A24F 40/50* (2020.01); *A24F 40/51* (2020.01); *A24F 40/65* (2020.01); *A24F 40/90* (2020.01); *A24F 47/00* (2013.01); *B05B 1/30* (2013.01); *H02J 7/0047* (2013.01); *A24F 40/10* (2020.01); *A24F 40/46* (2020.01)

(58) Field of Classification Search
CPC ........... A24F 40/50; A24F 40/51; A24F 40/53
See application file for complete search history.

(56) References Cited

U.S. PATENT DOCUMENTS

| | | | |
|---|---|---|---|
| 2005/0016550 A1* | 1/2005 | Katase | A24F 40/50 131/194 |
| 2011/0036346 A1* | 2/2011 | Cohen | A24F 40/60 128/200.14 |

* cited by examiner

*Primary Examiner* — Eric Yaary
(74) *Attorney, Agent, or Firm* — Dykema Gossett PLLC

(57) ABSTRACT

The present disclosure relates to systems and methods for controlling disabling of an electronic smoking device. An electronic smoking device includes a body through which a flow path at least partially extends, an air inlet in the body that is fluidly connected to the flow path, a liquid compartment for storing a liquid within the body, a vaporizer positioned in the body and configured to receive liquid from the liquid compartment and air from the flow path to generate vaporized liquid, an outlet in the body configured to receive vaporized liquid from the vaporizer, and circuitry connected to the vaporizer. In one embodiment, the circuitry is configured to shut off the electronic smoking device based on activation time of the vaporizer. In another embodiment, the circuitry is configured to shut off the electronic smoking device after a determined amount of usage has occurred.

16 Claims, 18 Drawing Sheets

Related U.S. Application Data continuation of application No. 15/876,959, filed on Jan. 22, 2018, now Pat. No. 10,638,795, which is a continuation of application No. 14/529,963, filed on Oct. 31, 2014, now Pat. No. 9,907,337, which is a continuation of application No. 13/099,266, filed on May 2, 2011, now Pat. No. 9,439,455.

(60) Provisional application No. 61/330,140, filed on Apr. 30, 2010.

(51) Int. Cl.
*A24F 40/10* (2020.01)
*A24F 40/46* (2020.01)

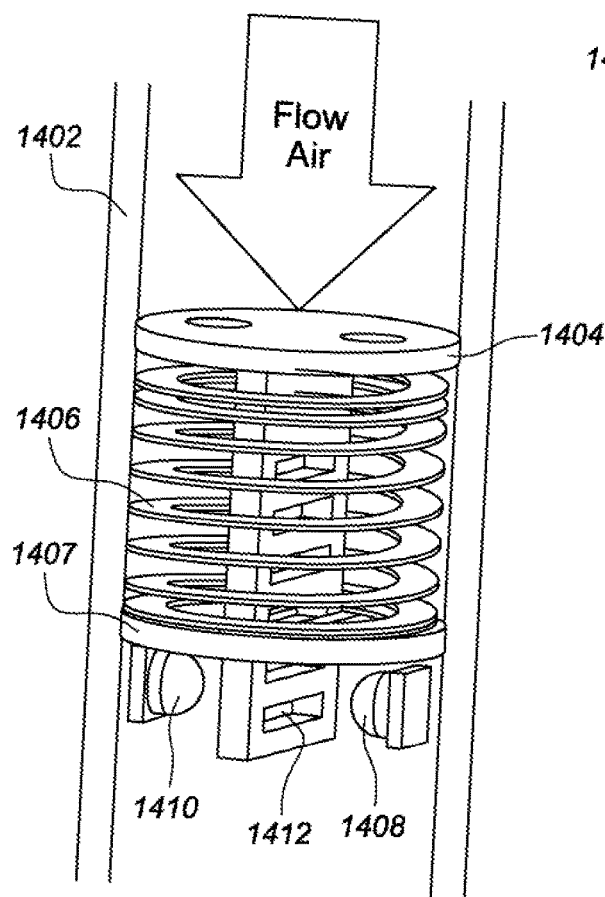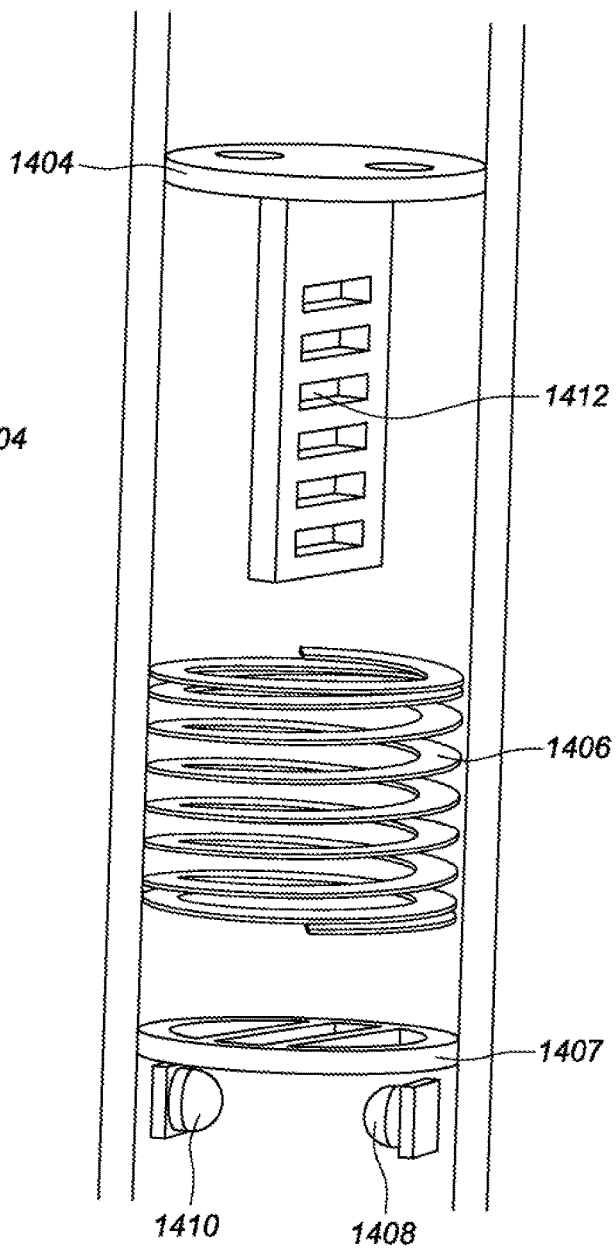
FIG. 14
FIG. 15

DISABLING CONTROL FOR AN ELECTRONIC SMOKING DEVICE

CROSS REFERENCE TO PRIOR APPLICATIONS

This application is a continuation of U.S. application Ser. No. 16/807,148, filed 2 Mar. 2020, now U.S. Pat. No. 11,712,067, which is a continuation of U.S. application Ser. No. 15/876,959, filed Jan. 22, 2018, now U.S. Pat. No. 10,638,795, which is a continuation of U.S. application Ser. No. 14/529,963, filed Oct. 31, 2014, now U.S. Pat. No. 9,907,337, which is a continuation of U.S. application Ser. No. 13/099,266, filed May 2, 2011, now U.S. Pat. No. 9,439,455, which claims the benefit of U.S. provisional Application No. 61/330,140, filed Apr. 30, 2010, all are hereby incorporated by reference in their entirety as though fully set forth herein.

BACKGROUND OF THE DISCLOSURE

1. Field of the Disclosure

This disclosure is directed to an electronic smoking device, and particularly to an electronic smoking device and an associated pack with enhanced features and functionalities for use therewith.

2. Related Art

Electronic cigarettes are a popular alternative to traditional tobacco based cigarettes that must be burned in order to generate smoke for inhalation. Electronic cigarettes provide a vapor for inhalation, but do not contain certain byproducts of combustion that may be harmful to human health. However, electronic cigarettes are a relatively new invention and current systems do not deliver the same "quality" of experience as traditional cigarettes. For example, electronic cigarettes have relatively slow rate of vaporization and this tends to produce an inconsistent quality of vapor. This may be due to the use of a wick that transports liquid from a disposable cartridge to the vaporizing element. The "wicking" method of fluid transport is a relatively slow method and therefore limits the rate at which the user can smoke the cigarette. Additionally, the wick limits the ability to control and monitor the amount of nicotine delivered to the user. Finally, the wick construction is more difficult to assemble and automate manufacturing, has limited quality, and may be contaminated.

Additionally, the user interface of early generation electronic cigarettes do not provide clear and intuitive information to the user. For example, while traditional cigarettes provide a visual indication when the smoking product has been exhausted, electronic cigarettes do not provide a similar clear indication.

Some users chose to smoke electronic cigarettes as part of a smoking cessation program. However, it is often difficult for the user to determine the exact amount of the product being consumed and thus difficult to measure the progress of such a cessation program. Accordingly, there is a need for an improved electronic cigarette.

SUMMARY OF THE DISCLOSURE

According to an aspect of the disclosure, an electronic smoking device includes a body through which a flow path at least partially extends, an air inlet in the body that is fluidly connected to the flow path, a liquid compartment for storing a liquid within the body, a vaporizer positioned in the body and configured to receive liquid from the liquid compartment and air from the flow path to generate vaporized liquid, an outlet in the body configured to receive vaporized liquid from the vaporizer, and circuitry connected to the vaporizer, the circuitry configured to shut off the electronic smoking device based on activation time of the vaporizer.

According to another aspect of the disclosure, a method of preventing usage of an electronic smoking device comprises determining how long a vaporizer has been activated, activating the vaporizer if the vaporizer has been activated an amount of time less than a predetermined time limit, and preventing usage of the electronic smoking device if the amount of time is equal to or greater than the predetermined time limit.

According to another aspect of the disclosure, an electronic smoking device comprises a housing, a liquid compartment for storing a liquid within the housing, a vaporizer positioned in the housing and configured to receive liquid from the liquid compartment, and circuitry connected to the vaporizer, the circuitry configured to shut off the electronic smoking device after a determined amount of usage has occurred.

According to another aspect of the disclosure, a method of disabling an electronic smoking device comprises reading the status of a sensor, if the sensor is active, determining how long a heater has been active over a product life of the electronic smoking device to determine a Cumulative On Time, comparing the Cumulative On Time to a Total Time representing a maximum Cumulative On Time for the product life, activating the vaporizer if the Cumulative On Time is less than the Total Time, disabling the electronic smoking device if the Cumulative On Time is equal to or greater than the Total Time, and if the sensor is inactive, continuing to read the status of the sensor.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIGS. 14 and 15 show a schematic of yet another sensor for the electronic smoking device constructed according to the principles of the disclosure.

DETAILED DESCRIPTION OF THE DISCLOSURE

Figure 1A:
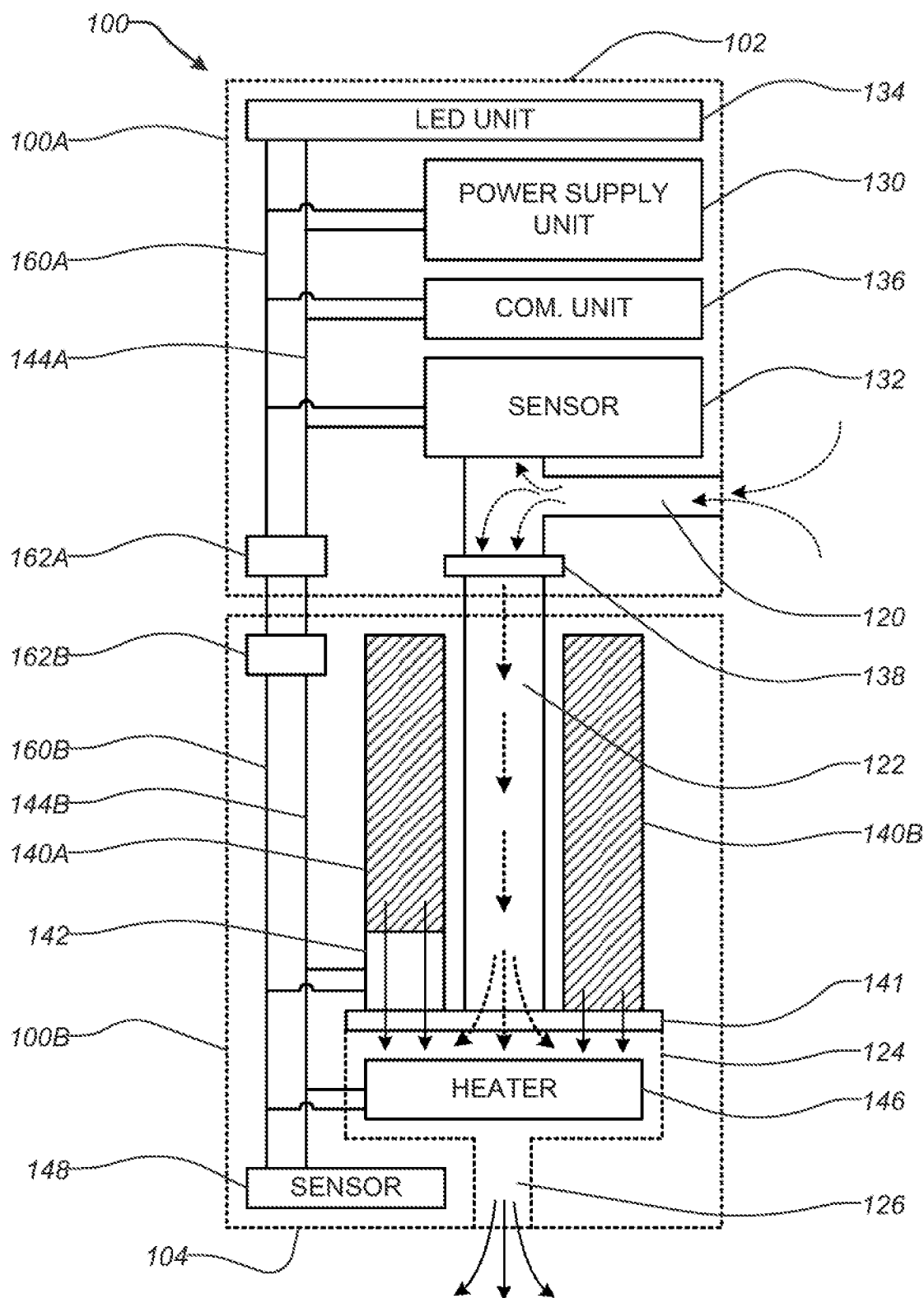
FIG. 1A shows a structural overview of an electronic smoking device constructed according to the principles of the disclosure.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Figure 2A:
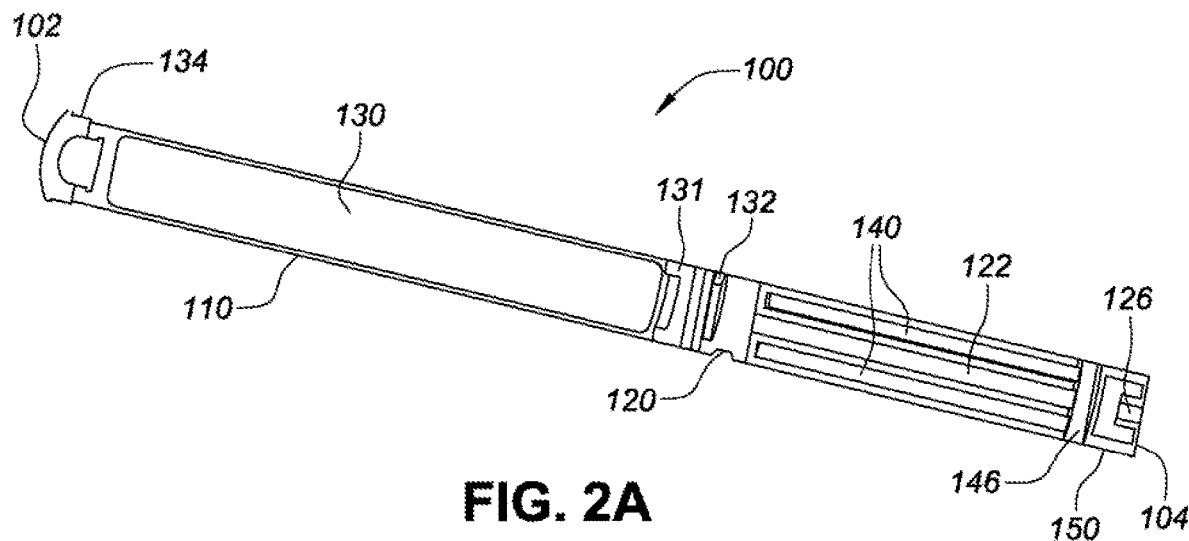
FIG. 2A shows a cross-section view of an exemplary design of the electronic smoking devices shown in FIGS. 1A and 1B, constructed according to the principles of the disclosure.

FIG. 1A shows a structural overview of an electronic smoking device (ESD) 100 constructed according to the principles of the disclosure. The ESD 100 may be disposable or reusable. The ESD 100 may have a multi-body construction including two or more bodies. For example, the ESD 100 may be a reusable ESD including a first body 100A and a second body 100B and/or the like, that may be easily connected to and disconnected from each other anytime without using any special tools. For example, each body may include threaded parts. Each body may be covered by a different housing. The second body 100B may contain consumable material, such as, e.g., smoking liquid and/or the like. When the consumable material is fully consumed, the second body 100B may be disconnected from the first body 100A and replaced with a new one. Also, the second body 100B may be replaced with another one with a different flavor, strength, type and/or the like. Alternatively, the ESD 100 may have a single body construction, as shown in FIG. 2A. Regardless of the construction type, the ESD 100 may have an elongated shape with a first end 102 and a second end 104, as shown in FIG. 2A, which may be similar to a conventional cigarette shape. Other non-conventional cigarette shapes are also contemplated. For example, the ESD 100 may have a smoking pipe shape or the like.

Figure 1B:
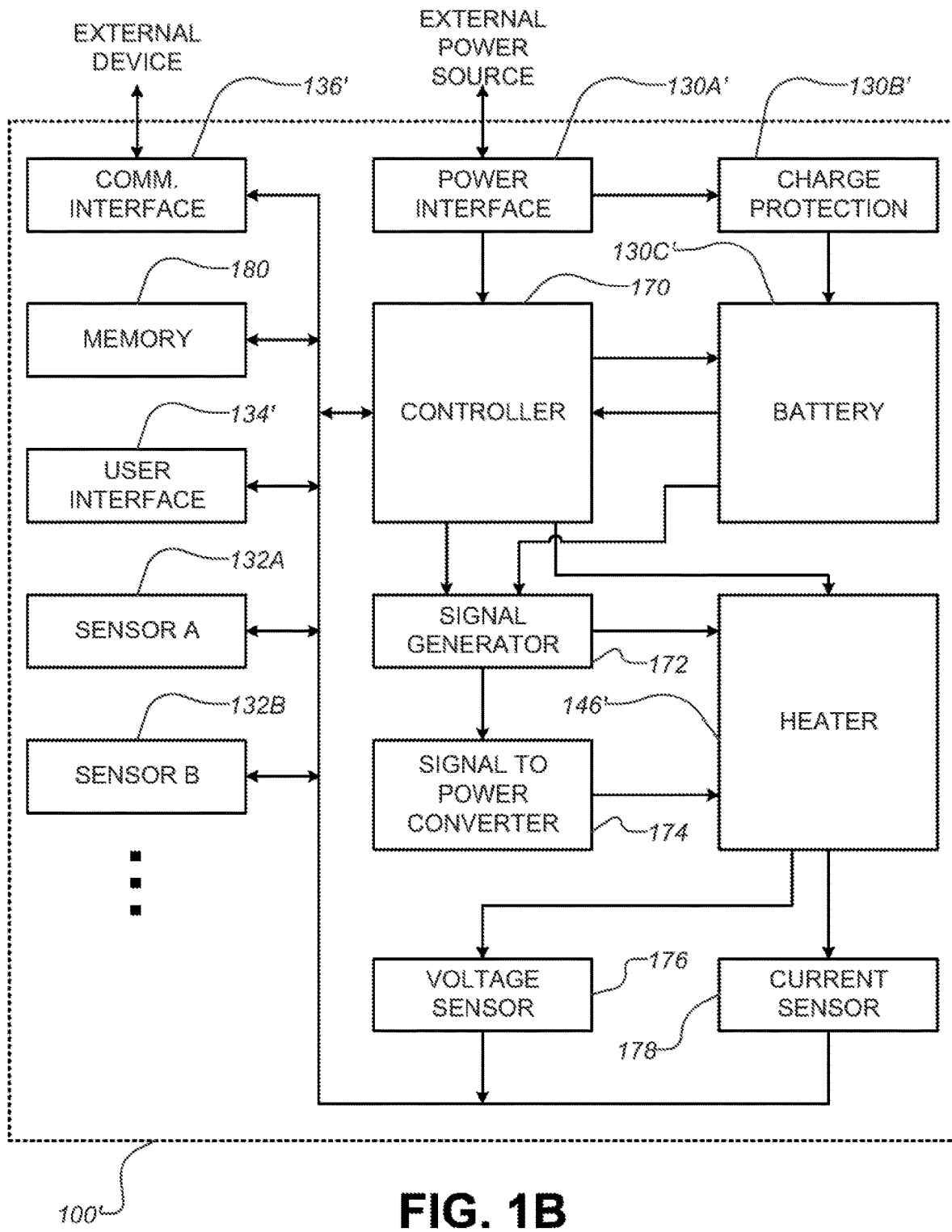
FIG. 1B shows a schematic overview of another aspect of the electronic smoking device constructed according to the principles of the disclosure.
Figure 5:
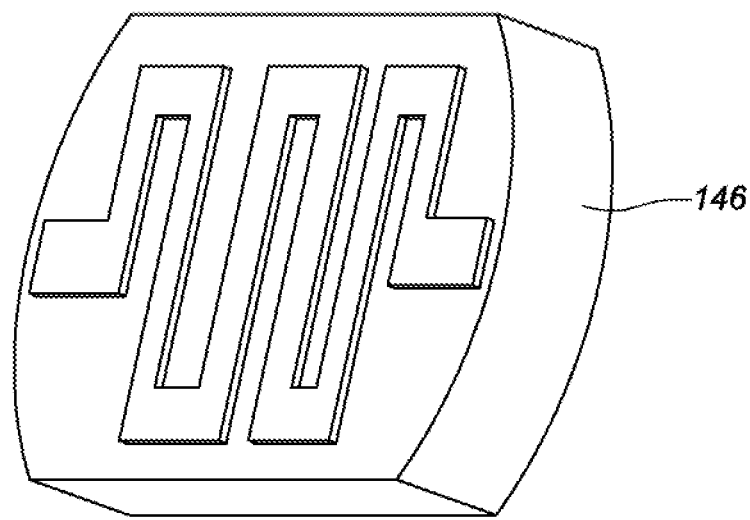
FIG. 5 shows a perspective view of a solid state heater of the electronic smoking device shown in FIG. 2A, constructed according to the principles of the disclosure.

The ESD 100 may include an air inlet 120, an air flow path 122, a vaporizing chamber 124, a smoke outlet 126, a power supply unit 130, a sensor 132, a container 140, a dispensing control device 141, a heater 146, and/or the like. Further, the ESD 100 may include a controller, such as, e.g., microcontroller, microprocessor, a custom analog circuit, an application-specific integrated circuit (ASIC), a programmable logic device (PLD) (e.g., field programmable gate array (FPGA) and the like) and/or the like and basic digital and analog circuit equivalents thereof, which is explained below in detail with reference to FIG. 1B. The air inlet 120 may extend from, for example, an exterior surface of the housing 110 as shown in FIG. 2A. The air flow path 122 may be connected to the air inlet 120 and extend to the vaporizing chamber 124. The smoke outlet 126 may be connected to the vaporizing chamber 124. The smoke outlet 126 may be formed at the second end 104 of the ESD 100 and connected to the vaporizing chamber 124. When a user sucks the second end 104 of the ESD 100, air outside the air inlet 120 may be pulled in and moved to the vaporizing chamber 124 via the air flow path 122, as indicated by the dotted arrows in FIG. 1A. The heater 146 may be a solid state heater shown in FIG. 5 or the like, and located in the vaporizing chamber 124. The container 140 may contain the smoking liquid and may be connected to the vaporizing chamber 124. The container 140 may have an opening connected to the vaporizing chamber 124. The container 140 may be a single container or a group of containers, such as, e.g., containers 140A, 140B and the like, that are connected to or separated from each other.

The dispensing control device 141 may be connected to the container 140 in order to control flow of the smoking liquid from the container 140 to the vaporizing chamber 124. When the user is not smoking the ESD 100, the dispensing control device 141 may not dispense the smoking liquid from the container 140, which is described below in detail with reference to FIGS. 3 and 4. The dispensing control device 141 may not need any electric power from, for example, the power supply unit 130 and/or the like, for operation.

Figure 4:
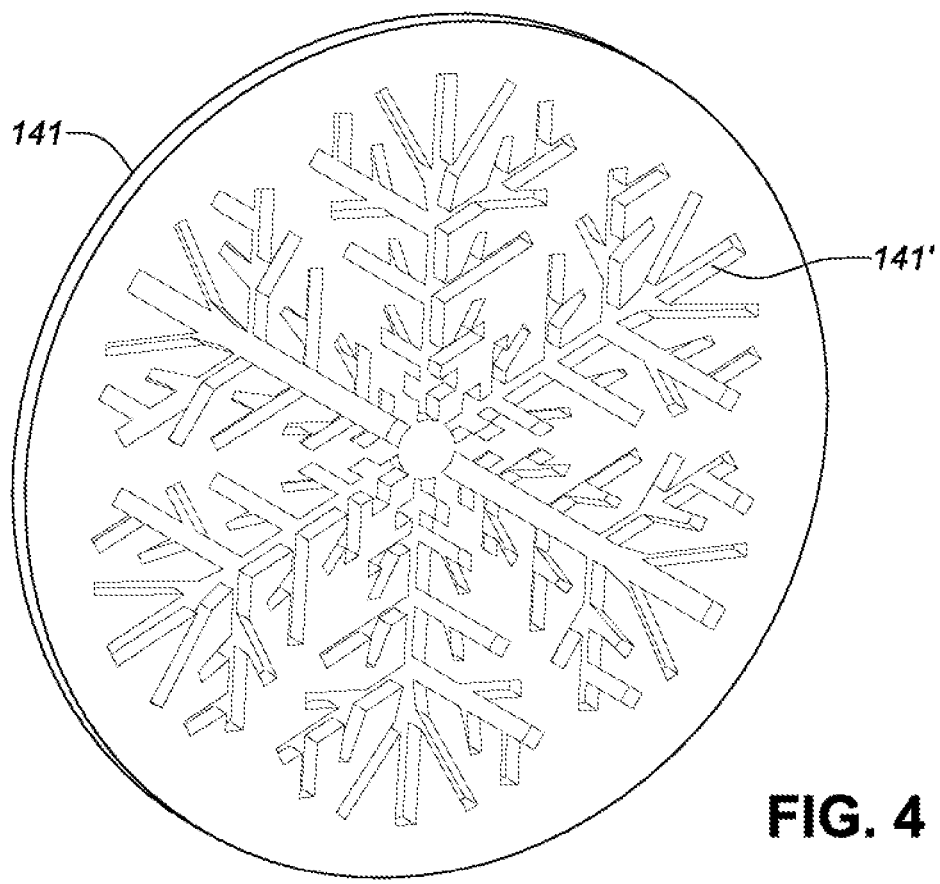
FIG. 4 shows an enlarged view of the micromesh screen shown in FIG. 3, constructed according to the principles of the disclosure.

In one aspect, the dispensing control device 141 may be a micro liquid screen 141, such as, e.g., micro-etched screen, micromesh screen and the like. As shown in FIG. 4, the micro liquid screen 141 may have a micro aperture pattern 141', which may keep the smoking liquid from seeping out therethrough by a surface tension and/or the like when the ESD 100 is not being used or when an air flow within the vaporizing chamber 124 is minimal. When an external force is applied, the smoking liquid may flow through the micro liquid screen 141. For example, when the user sucks the second end 104 of the ESD 100, an air flow may be formed in the vaporizing chamber 124 from the air flow path 122 to the smoke outlet 126, which may temporarily break the surface tension of the smoking liquid formed at the micro aperture pattern 141' of the micro liquid screen 141. When the air flow is discontinued, the surface tension may be reestablished at the micro aperture pattern 141' of the micro liquid screen 141, and the smoking liquid may stop being drawn therethrough. The micro liquid screen 141 may have a circular shape with a diameter larger than that of the container 140. One side of the micro liquid screen 141 may face an opening of the container 140 and the air flow path 122, and the other side may face the vaporizing chamber 124 and the heater 146.

Figure 6:
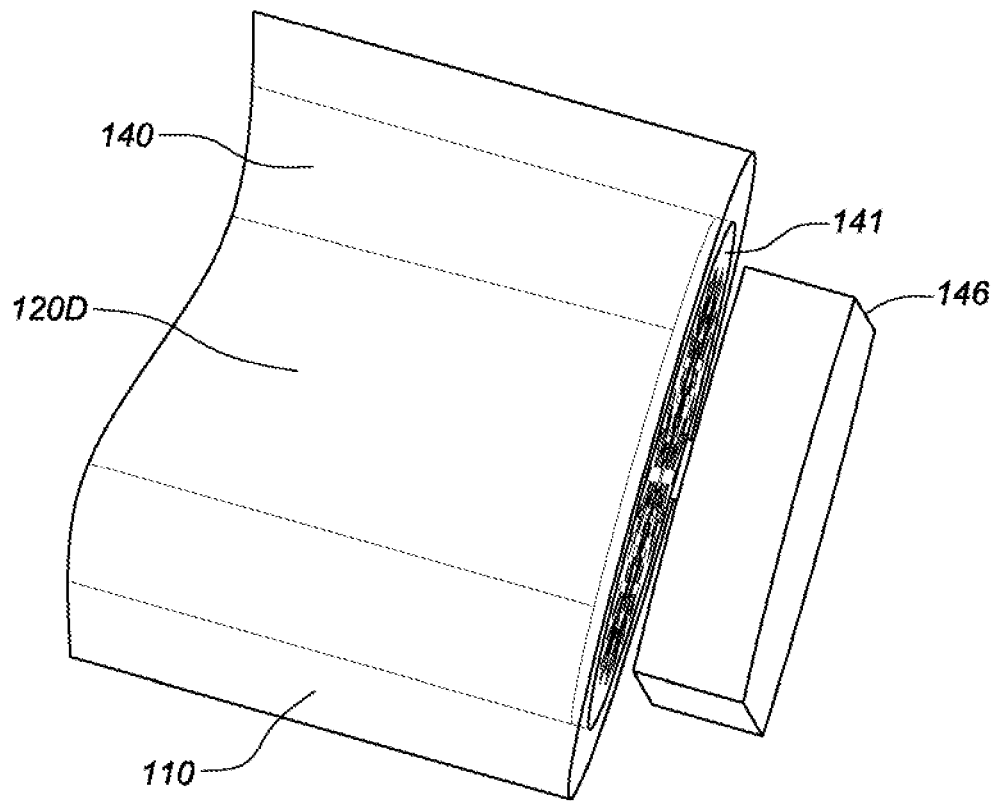
FIG. 6 shows the solid state heater shown in FIG. 5 arranged in association with the micromesh screen shown in FIG. 4.

The micro liquid screen 141 may be a passive device that does not require electric power and a control signal. Other passive or active filtering/screening devices are also contemplated for the dispensing control device 141. For example, the dispensing control device may be a semi-active dispensing device, such as, e.g., electro-permeable membrane or the like, which does not allow a liquid to flow therethrough unless an electrical field is applied thereto. Alternatively or additionally, an active dispensing device 142 may be connected to the container 140 in order to consistently dispense substantially the same amount of smoking liquid to the vaporizing chamber 124 each time. As shown in FIG. 6 the dispensing control device 141 and the heater 146 may be located adjacent to each other a very small gap therebetween, in order to efficiently vaporize the smoking liquid.

The power supply unit 130 may be connected to one or more components that require electric power, such as, e.g., the sensor 132, the active dispensing device 142, the heater 146, and the like, via a power bus 160. The power supply unit 130 may include a battery (not shown), such as, e.g., a rechargeable battery, a disposable battery and/or the like. The power unit 130 may further include a power control logic (not shown) for carrying out charging of the battery, detecting the battery charge status, performing power save operations and/or the like. The power supply unit 130 may include a non-contact inductive recharging system such that the ESD 100 may be charged without being physically connected to an external power source. A contact charging system is also contemplated.

The sensor 132 may be configured to detect the user's action for smoking, such as, e.g., sucking of the second end 104 of the ESD 100, touching of a specific area of the ESD 100 and/or the like. When the user's action for smoking is detected, the sensor 132 may send a signal to other components via a data bus 144A, 144B. For example, the sensor 132 may send a signal to turn on the heater 146. Also, the sensor 132 may send a signal to the active dispensing device 142 (if utilized) to dispense a predetermined amount of the smoking liquid to the vaporizing chamber 124. When the smoking liquid is dispensed from the container 140A, 140B and the heater 146 is turned on, the smoking liquid may be mixed with the air from the flow path 122 and vaporized by the heat from the heater 146 within the vaporizing chamber 124. The resultant vapor (La, smoke) (i.e., smoke) may be pulled out from the vaporizing chamber 124 via the smoke outlet 126 for the user's oral inhalation, as indicated by solid arrows in FIG. 1A. In order to prevent the smoke generated in the vaporizing chamber 124 from flowing towards the air inlet 120, the air flow path 122 may include a backflow prevention screen or filter 138.

When the user's action for smoking is stopped, the sensor 132 may send another signal to turn off the heater 146, the active dispensing device 142, and/or the like, and vaporization and/or dispensing of the smoking liquid may stop immediately. In an alternative embodiment, the sensor 132 may be connected only to the power supply unit 130. When the user's action for smoking is detected, the sensor 132 may send a signal to the power supply unit 130. In response to the signal, the power supply unit 130 may turn on other components, such as, e.g., the heater 146 and the like, to vaporize the smoking liquid.

In an embodiment, the sensor 132 may be an air flow sensor. For example, the sensor 132 may be connected to the air inlet 120, the air flow path 122, and/or the like, as shown in FIG. 1A. When the user sucks the second end 104 of the ESD 100, some of the air pulled in from the air inlet 120 may be moved towards the sensor 132, which may be detected by the sensor 132. Additionally or alternatively, a capacitive sensor 148 may be used to detect the user's touching of a specific area of the housing 100. For example, the capacitive sensor 148 may be formed at the second end 104 of the ESD 100. When the ESD 100 is moved to the user's mouth and the user's lip touches the second end 104, a change in capacitance may be detected by the capacitive sensor 148, and the capacitive sensor 148 may send a signal to activate the heater 146 and the like. Other types of sensors are also contemplated for detecting the user's action for smoking, including, for example, an acoustic sensor, a pressure sensor, a touch sensor, an optical sensor, a Hall Effect sensor, an electromagnetic field sensor, and/or the like.

The ESD 100 may further include a communication unit 136 for wired (e.g., SPI (Serial Peripheral Interface) or the like) and/or wireless communications with other devices, such as, e.g., a pack 200 (shown in FIG. 7A) for the ESD 100, a computer 320A, 320B (shown in FIG. 9) and/or the like. The communication unit 136 may also connect the ESD 100 to a wired network (e.g., LAN, WAN, Internet, Intranet and/or the like) and/or a wireless network (e.g., a WIFI network, a Bluetooth network, a cellular data network and/or the like). For example, the communication unit 136 may send usage data, system diagnostics data, system error data, and/or the like to the pack 200, the computer 320, and/or the like. To establish wireless communication, the communication unit 136 may include an antenna and/or the like. The ESD 100 may include a terminal 162 for wired communication. The terminal 162 may be connected to another terminal, such as, e.g., a cigarette connector 216 (shown in FIG. 8) of the pack 200 or the like, in order to exchange data. The terminal 162 may also be used to receive power from the pack 200 or other external power source and recharge the battery in the power supply unit 130.

When the ESD 100 has a multi-body construction, the ESD 100 may include two or more terminals 162 to establish power and/or data connection therebetween. For example, in FIG. 1A, the first body 100A may include a first terminal 162A and the second body 100B may include a second terminal 162B. The first terminal 162A may be connected to a first power bus 160A and a first data bus 144A. The second terminal 162B may be connected to a second power bus 160B and a second data bus 144B. When the first and second bodies 100A and 100B are connected to each other, the first and second terminals 162A and 162B may be connected to each other. Also, the first power bus 160A and the first data bus 144A are connected to the second power bus 160B and the second data bus 144B, respectively. To charge the battery in the power supply unit 130, exchange data and/or the like, the first body 100A may be disconnected from the second body 100B and connected to the pack 200 or the like, which may, in turn, connect the first terminal 162A to the cigarette connector 216 of the pack 200 or the like. Alternatively, a separate terminal (not shown) may be provided to the ESD 100 for charging and/or wired communications with an external device.

The ESD 100 may further include one or more user interface devices, such as, e.g., an LED unit 134, a sound generator (not shown), a vibrating motor (not shown), and/or the like. The LED unit 134 may be connected to the power supply unit 130 via the power bus 160A and the data bus 144A, respectively. The LED unit 134 may provide a visual indication when the ESD 100 is operating. Additionally, when there is an issue and/or problem within the ESD 100, the integrated sensor/controller circuit 132 may control the LED unit 134 to generate a different visual indication. For example, when the container 140 is almost empty or the battery charge level is low, the LED unit 134 may blink in a certain pattern (e.g., blinking with longer intervals for thirty seconds). When the heater 146 is malfunctioning, the heater 146 may be disabled and control the LED unit 134 may blink in a different pattern (e.g., blinking with shorter intervals for one minute). Other user interface devices may be used to show a text, image, and/or the like, and/or generate a sound, a vibration, and/or the like.

In the ESD 100 shown in FIG. 1A, the sensor 132 alone may not be able to control the user interface devices, the communication unit 136, the sensors 132 and 148 and/or the like. Furthermore, it may not be possible to carry out more complex and sophisticated operations with the sensor 132 alone. Thus, as noted above, a controller, such as, e.g., microcontroller, microprocessor, a custom analog circuit, an application-specific integrated circuit (ASIC), a programmable logic device (PLD) (e.g., field programmable gate array (FPGA) and the like) and/or the like and basic digital and analog circuit equivalents thereof, may be included the ESD 100. For example, FIG. 13 FIG. 1B_shows a structural overview of another ESD 100' constructed according to the principles of the disclosure. The ESD 100' may include a controller 170, a signal generator 172, a signal to power converter 174, a voltage sensor 176, a current sensor 178, a memory 180, and/or the like. Further, the ESD 100' may include a power interface 130A', a charge/discharge protection circuit 130B', a battery 130C', one or more sensors (e.g., sensor 132A, sensor 132B and/or the like), a user interface 134', a communication interface 136', a heater 146' and/or the like, which may be similar to the components of the ESD 100 shown in FIG. 1A. Two or more components may be integrated as a single chip, a logic module, a PCB, or the like, to reduce size and manufacturing costs and simplify the manufacturing process. For example, the controller 170 and a sensor 132A may be integrated as a single semiconductor chip.

The controller 170 may perform various operations, such as, e.g., heater calibration, heating parameter adjustment/control, dosage control, data processing, wired/wireless communications, more comprehensive user interaction, and/or the like. The memory 180 may store instructions executed by the controller 170 to operate the ESD 100' and carry out various basic and advanced operations. Further, the memory 180 may store data collected by the controller 170, such as, e.g., usage data, reference data, diagnostics data, error data, and/or the like. The charge/discharge protection circuit 130B' may be provided to protect the battery 130C' from being overcharged, overly discharged, damaged by an excessive power and/or the like. Electric power received by the power interface 130A' may be provided to the battery 130C' via the charge/discharge protection circuit 130B'. Alternatively, the controller 170 may perform the charge/discharge protection operation when the charge/discharge protection circuit 130B' is not available. In this case, the electric power received by the power interface 130A' may be provided to the battery 130C' via the controller 170.

The signal generator 172 may be connected to the controller 170, the battery 130C' and/or the like, and may be configured to generate a power control signal, such as, e.g., a current level signal, a voltage level signal, a pulse-width modulation (PWM) signal and the like, to control the power supplied to the heater 146'.

Alternatively, the power control signal may be generated by the controller 170. The converter 174 may be connected to the signal generator 172 or the controller 170 to convert the power control signal from the signal generator 172 to an electrical power provided to the heater 146. With this configuration, the power from the battery 130C' may be transferred to the heater 146' via the signal generator 172 or via the signal generator 172 and the converter 174. Alternatively, the power from the battery 130C' may be transferred to the signal generator 172 via the controller 170 and transferred to the heater 146 directly or via the signal to power converter 174.

The voltage sensor 176 and the current sensor 178 may be provided to detect an internal voltage and current of the heater 146', respectively, for heater calibration, heating parameter control and/or the like. For example, each heater 146 may have a slightly different heating temperature, which may be caused by a small deviation in resistance. To produce a more consistent unit-to-unit heating temperature, the integrated sensor/controller circuit 132 may measure a resistance of the heater 146 and adjust heating parameters (e.g., an input current level, heating duration, voltage level, and/or the like) accordingly. Also, the heating temperature of the heater 146 may change while the heater 146 is turned on. The integrated sensor 132/controller 170 circuit may monitor a change in resistance while the heater 146 is turned on and adjust the current level in a real-time basis to maintain the heating temperature at substantially the same level. Further, the integrated sensor 132/controller circuit 170 may monitor whether or not the heater 146 is overheating and/or malfunctioning, and disable the heater 146 for safety purposes when the heating temperature is higher than a predetermined temperature range and/or the heater 146 or other component is malfunctioning.

Figure 16:
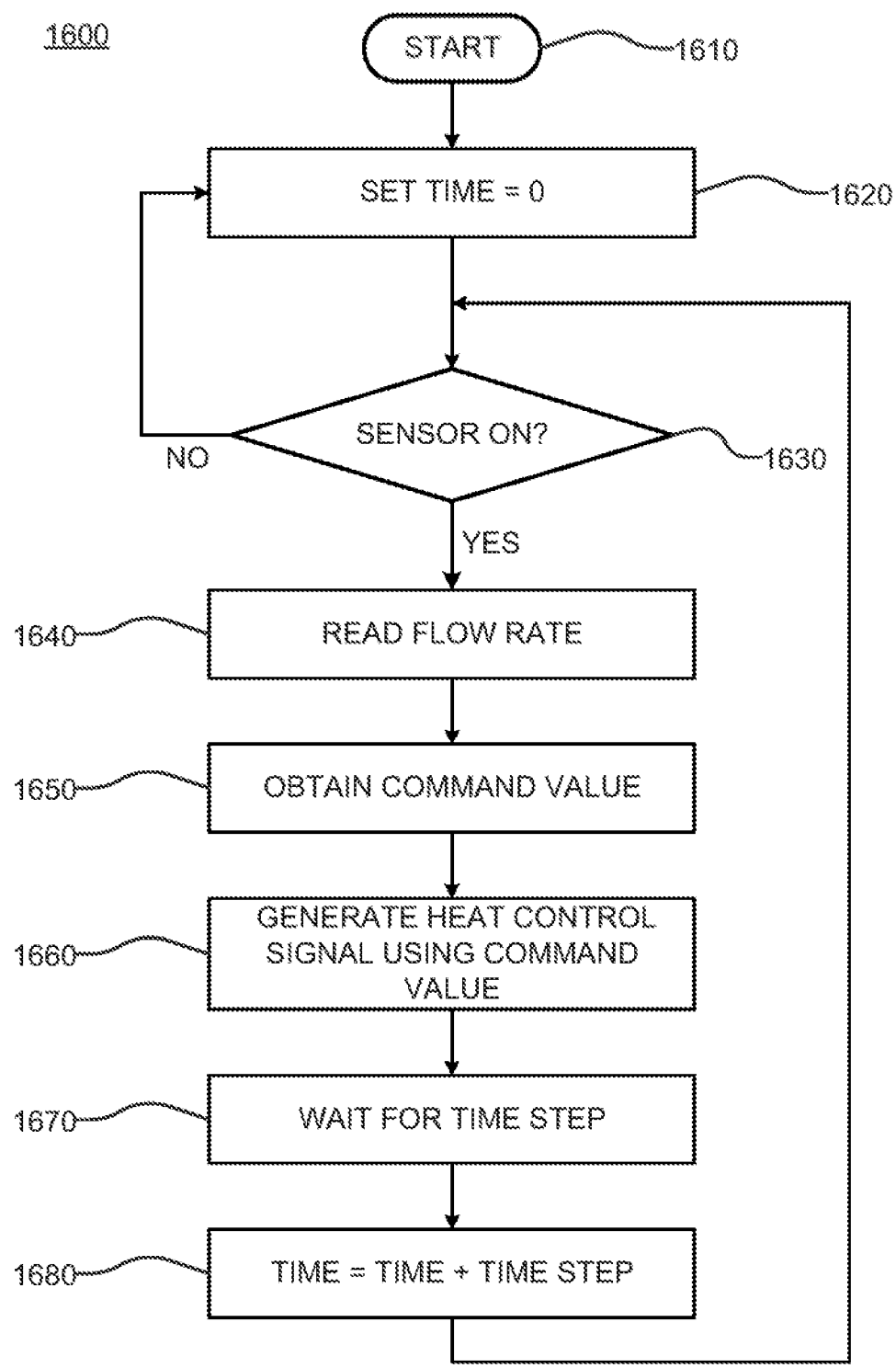
FIGS. 16, 17, 18, 19, 20 and 21 show flowcharts of various processes for carrying several advanced functionalities in an electronic smoking device according to the principles of the disclosure.

For example, FIGS. 16, 17, 18, 19, 20 and 21 show various processes for carrying out advanced functionalities in the ESD 100 or ESD 100' according to the principles of the disclosure. FIG. 16 shows a flowchart for a process 1600 for heater characterization based heat control refinement according to the principles of the disclosure. Upon starting the process 1600 (at 1610), TIME may be set to zero (0) (at 1620). When the sensor 132 (i.e., air flow sensor) is not on (NO at 1630), the process 1600 may move back to set TIME to zero (0) (at 1620). When the sensor is on (YES at 1630), the controller 170 may read an air flow rate (at 1640). Then the controller 170 may look up a characterization formula (e.g., one or more time versus temperature curves or the like)

or table (e.g., lookup table or the like) based on at least one of the air flow rate and the time in order to obtain COMMAND VALUE, which is a value that the controller 170 determines to be for the ter 146 at any moment in time (at 1650). The COMMAND VALUE may then be applied to the heater 146, and the heater 146 generates heat based on the COMMAND VALUE (at 1660). The controller 170 may then wait for a time period TIME STEP (e.g., 1 second) (at 1670), which defines a time interval between the air flow rate reading (at 1640) and the TIME STEP is added to the current TIME (at 1680) and the process 1600 may move back to checking whether the sensor 132 is on or not (at 1630).

Figure 17:
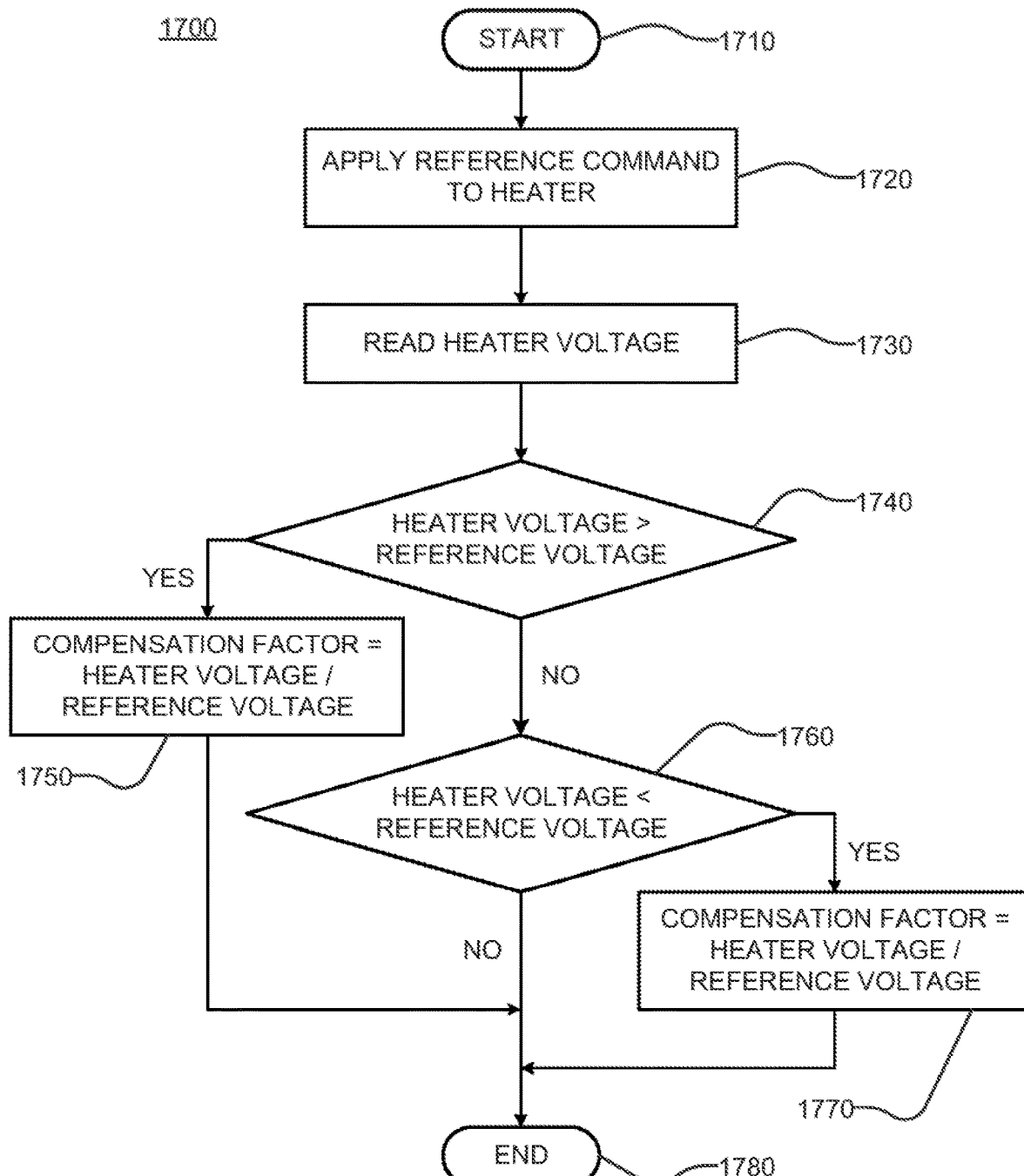

FIG. 17 shows a flowchart for process 1700 for heater self-calibration control according to the principles of the disclosure. Upon starting the process 1700 (at 1710), REFERENCE COMMAND may be applied to the heater 146 (at 1720). The REFERENCE COMMAND may be a heater command value established by the manufacturer to test a resistance of the heater 146. Then the voltage sensor 176 may read the internal voltage (i.e., HEATER VOLTAGE) of the heater 146 (at 1730). The HEATER VOLTAGE may be then compared to REFERENCE VOLTAGE, which may be a normal voltage drop expected to be measured across the heater 146 based on the characterization of the heater wire at the manufacturer. When the HEATER VOLTAGE is greater than the REFERENCE VOLTAGE (YES at 1740), the value of the HEATER VOLTAGE divided by the REFERENCE VOLTAGE may be set as COMPENSATION FACTOR (at 1750), which may be a value, by which future heater commands may be multiplied for the purpose of compensating for inconsistency of the heater resistance value among the heaters. The COMPENSATION FACTOR may be initially set to one (1). When the HEATER VOLTAGE is smaller than the REFERENCE VOLTAGE (NO at 1740, YES at 1760), the value of the HEATER VOLTAGE divided by the REFERENCE VOLTAGE may be set as the COMPENSATION FACTOR (at 1770). When the HEATER VOLTAGE is not greater than the REFERENCE VOLTAGE (NO at 1740) and not smaller than the REFERENCE VOLTAGE (NO at 1760), there may be no change in the COMPENSATION FACTOR and the process 1700 may terminate (at 1780).

Figure 18:
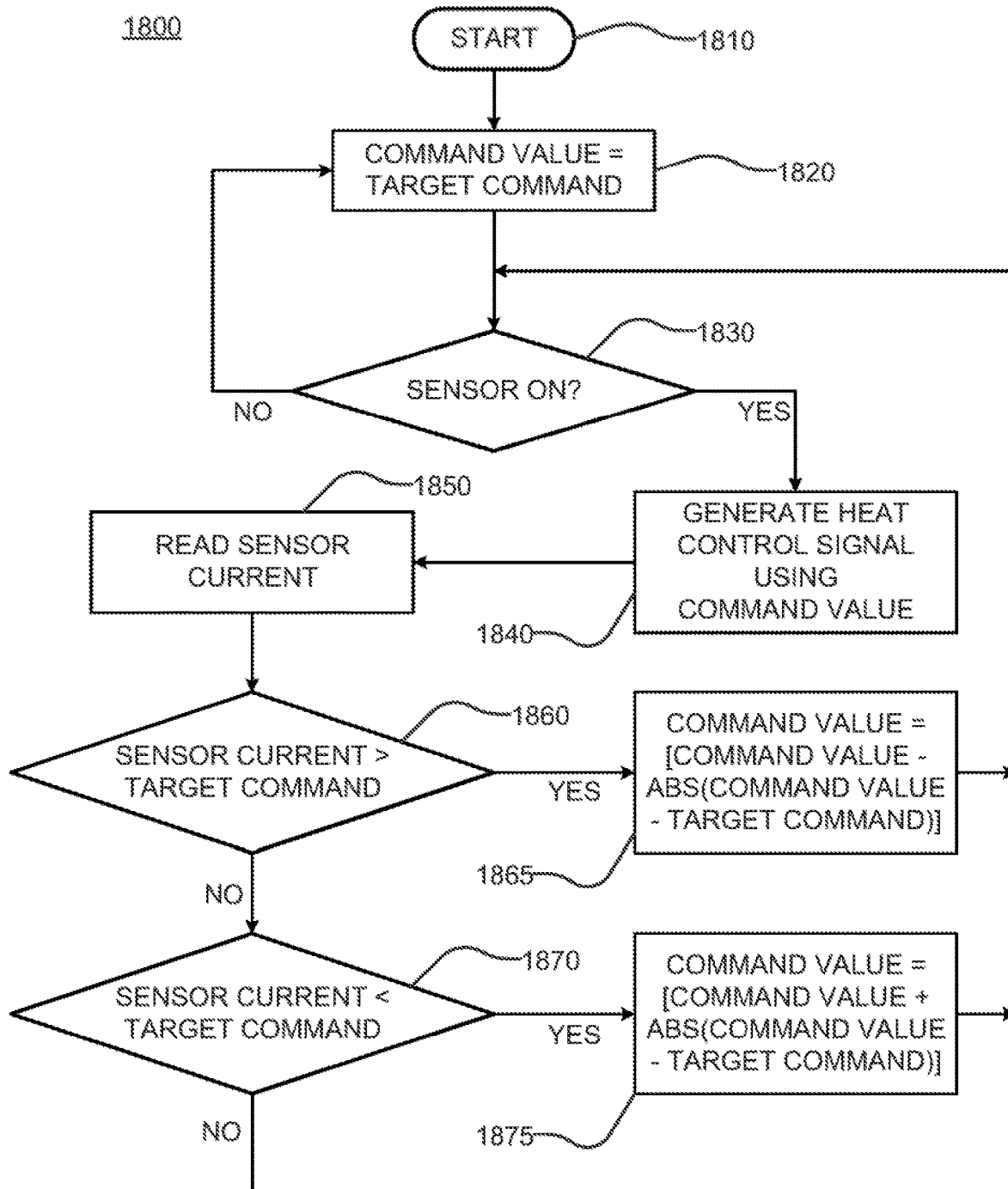

FIG. 18 shows a flowchart for a process 1800 for current monitoring based heater control according to the principles of the disclosure. Upon starting the process (at 1810), TARGET COMMAND may be set as COMMAND VALUE (at 1820). The TARGET COMMAND may be a constant that sets a target heat command for the heater 146 typically based on characterizations of the heater wire at the manufacturer. The COMMAND VALUE may be a value that the controller 170 may send to the heater 146. The COMMAND VALUE may be a value that the controller 170 believes the heater command should be at any moment in time. When the sensor 132 (e.g., inhalation sensor) is turned off (NO at 1830), the process 1800 may move back to step 1820. When the sensor 132 is turned on (YES at 1830), a heater control signal may be generated based on the COMMAND VALUE (at 1840) and the current sensor 178 may read an internal current of the heater 146 (at 1850) and store it as SENSOR CURRENT. Then, the SENSOR CURRENT may be compared to the TARGET COMMAND (at 1860, 1870). When the SENSOR CURRENT is greater than the TARGET COMMAND (YES at 1860), an absolute value of COMMAND VALUE-(COMMAND VALUE-TARGET COMMAND) may be set as a new COMMAND VALUE (at 1865) and the process 1800 may move to step 1830. When the SENSOR CURRENT is smaller than the TARGET COMMAND (NO at 1860, YES at 1870), an absolute value of COMMAND VALUE+(COMMAND VALUE-TARGET COMMAND) may be set as the new COMMAND VALUE (at 1875) and the process 1800 may move to step 1830. When the SENSOR CURRENT is not greater than and not smaller than the TARGET COMMAND (NO at 1860, NO at 1870), no change may be made to the COMMAND VALUE and the process 1800 may move to step 1830.

Figure 19:
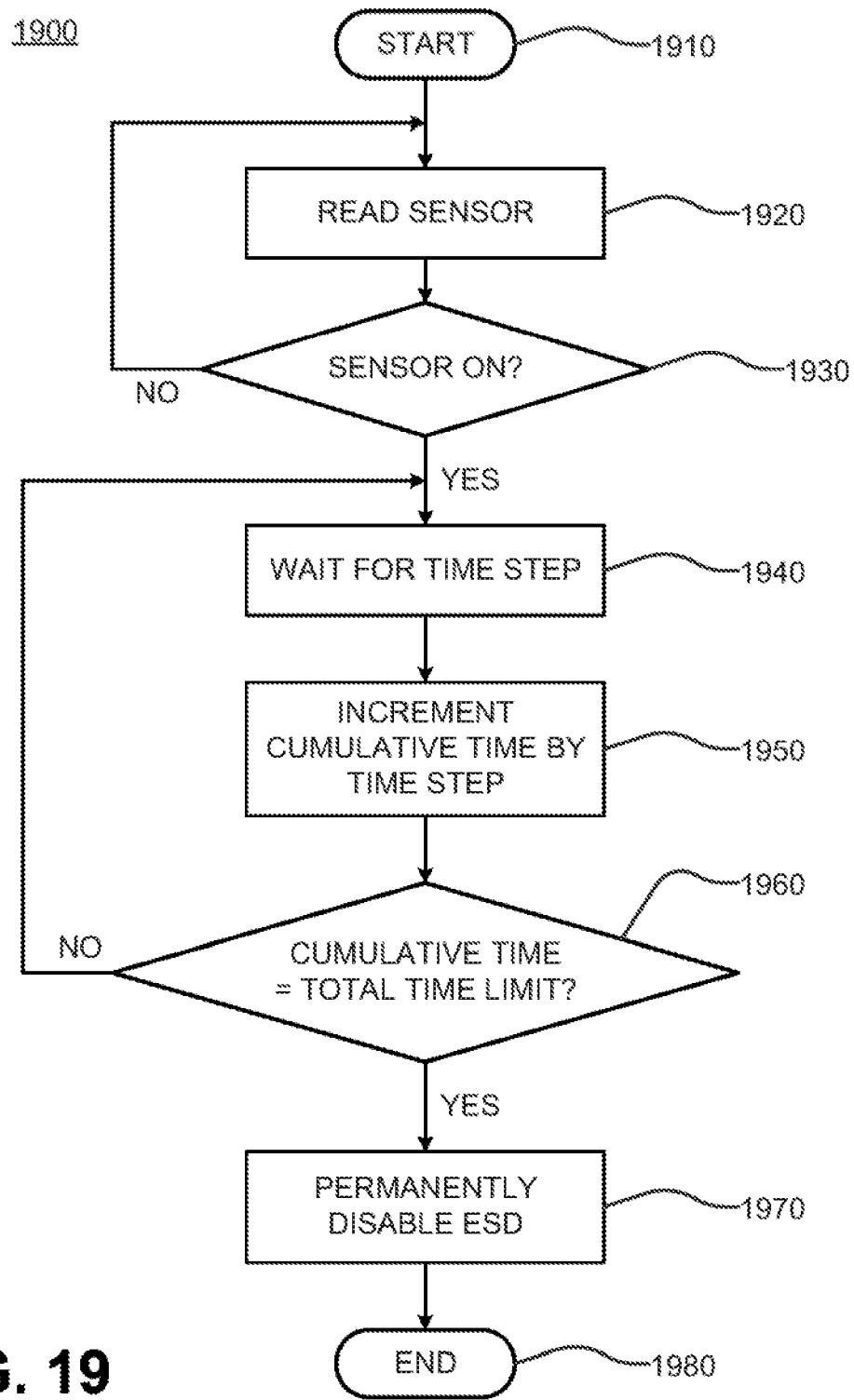

FIG. 19 shows a flowchart for a process 1900 for limiting smoking liquid deterioration and contamination after the first use according to the principles of the disclosure. Upon starting the process 1900 (at 1910), the controller may read the sensor 132 (at 1920) to check whether the sensor 132 is on or not. When the sensor 132 is not on (NO at 1930), the process 1900 may move back to read the sensor 132 (at 1920). When the sensor 132 is on (YES at 1930), the controller 170 may wait for a predetermined period of time TIME STEP (at 1940) and increment CUMULATIVE TIME by the TIME STEP (at 1950). The CUMULATIVE TIME may be a count value that indicates a total period of time since the heater 146 was first activated during the life of the ESD 100'. Then the CUMULATIVE TIME may be compared to TOTAL TIME LIMIT, which is a constant that sets an upper limit for the total period of time that may elapse between a first use and a last use of the ESD 100'. When the CUMULATIVE TIME has not reached the TOTAL TIME LIMIT (NO at 1960), and the process 1900 may move back to step 1940. When the CUMULATIVE TIME has reached the TOTAL TIME LIMIT (YES at 1960), the ESD 100' may be disabled permanently (at 1970), and the process 1900 may terminate at 1980.

Figure 20:
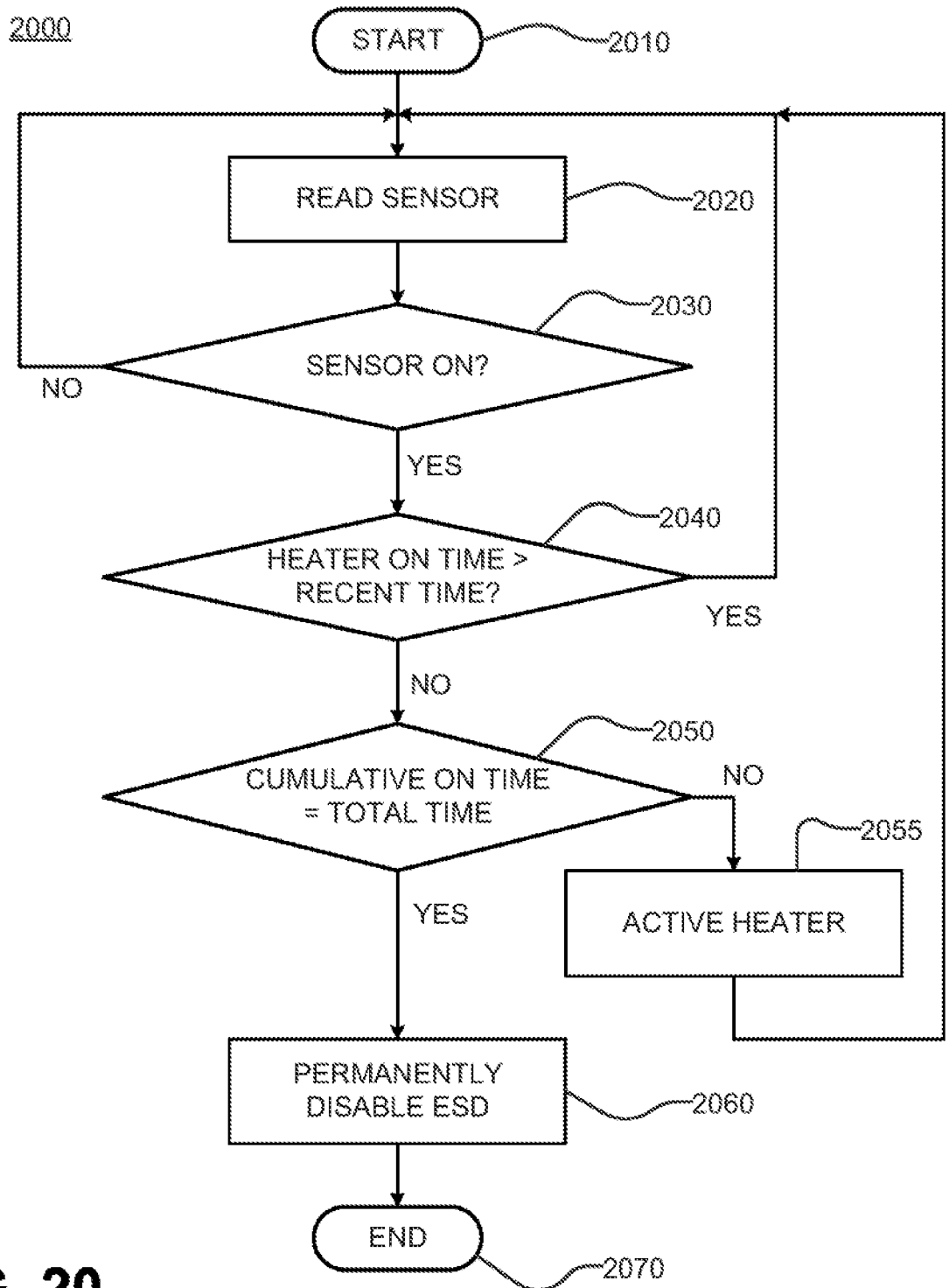

FIG. 20 shows a flowchart of a process 2000 for simplified dosage and/or heater control according to the principles of the disclosure. Upon starting the process 2000, the controller 170 may read the sensor 132 (at 2020). When the sensor 132 is not on (NO at 2030), the controller 170 may keep reading the sensor 132 (at 2020). When the sensor 132 is on (YES at 2030), the controller 170 may compare HEATER ON TIME and RECENT TIME. The HEATER ON TIME may indicate a period of time the heater 146 has been turned on since the last time the heater 146 has been turned off. The RECENT TIME may be a constant that sets a limit for the time period the heater 146 may stay turned on during any given period of time, thereby establishing a limit for the dosage per unit time that may be delivered. When the HEATER ON TIME is greater than the RECENT TIME (YES at 2040), the process 2000 may move to reading the sensor 132 (at 2020). When the HEATER ON TIME is smaller than the RECENT TIME (NO at 2040), a CUMULATIVE ON TIME may be compared to TOTAL TIME (at 2050). THE CUMULATIVE ON TIME may be a count value that indicates the total time the heater has been turned on during the product life of the ESD 100'. The TOTAL TIME may be a constant that sets a total period of time the heater 146 may stay turned on the product life of the ESD 100'. When the CUMULATIVE ON TIME has not reached the TOTAL TIME (NO at 2050), the heater 146 may be turned on (at 2055) and the process 2000 may move back to step 2020. When the CUMULATIVE ON TIME has reached the TOTAL TIME (YES at 2050), the ESD 100' may be permanently disabled (at 2060), and the process 2000 may terminate (at 2070).

Figure 21:
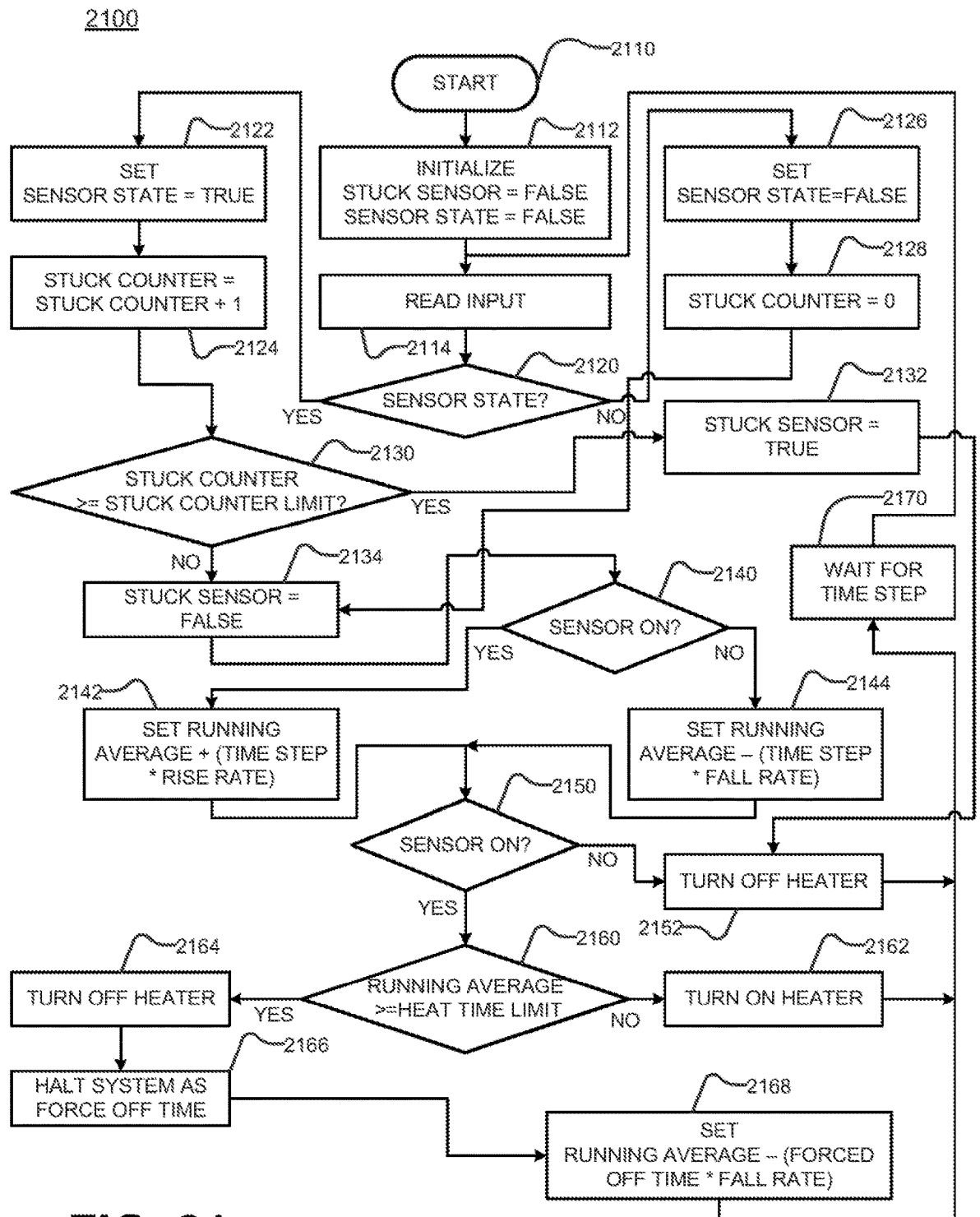

FIG. 21 shows a flowchart of a process 2100 for stuck sensor checking, heater temperature control, and forced system halting according to the principles of the disclosure. Upon starting the process 2110, the controller 170 may initialize both a stuck sensor value STUCK SENSOR and a sensor state SENSOR STATE by indicating them as false values (at 2112), and read an input of the sensor 132 (at 2114). When the SENSOR STATE is positive (YES at 2120), the controller 170 may set the SENSOR STATE as a true value, increment a stuck counter value STUCK COUNTER by the factor of one (1) (at 2124). When the STUCK COUNTER is equal to or larger than a stuck counter limit value STUCK COUNTER LIMIT (YES at 2130), the controller 170 may set the STUCK SENSOR as a true value (at 2132). When the STUCK COUNTER is not equal to or larger than the STUCK COUNTER LIMIT (NO at 2130), the controller 170 may set the STUCK SENSOR as a false value (at 2134). When the SENSOR STATE is negative (NO at 2120), the controller 170 may set the SENSOR STATE as a false value (at 2126), initialize the STUCK COUNT to zero (0) (at 2128), which may complete stuck sensor checking.

After setting the STUCK SENSOR as a true value (at 2132), the controller 170 may turn off the heater 146 (at 2152). Alternatively, after setting the STUCK SENSOR as a false value (at 2134), the controller 170 may check whether or not the sensor 132 is on (at 2140). When the sensor 132 is on (YES at 2140), a value of TIME STEP multiplied by RISE RATE may be added to a running average value RUNNING AVERAGE (at 2142). When the sensor 132 is not on (NO at 2140), the value of TIME STEP multiplied by RISE RATE may be subtracted from the RUNNING AVERAGE (at 2144). Then, the controller 170 may check whether or not the sensor 132 is on (at 2150). When the sensor 132 is not on (NO at 2150), the controller 170 may turn off the heater 146 (at 2152) and wait for the TIME STEP (at 2170), and the process 2100 may move back to read the sensor input (at 2114). When the sensor 132 is on (YES at 2150), the controller 170 may check whether the RUNNING AVERAGE is equal to or larger than a heat time limit value HEAT TIME LIMIT (at 2160). When the RUNNING AVERAGE is not equal to or larger than the HEAT TIME LIMIT (NO at 2160), the controller 170 may turn on the heater 146 and the process 2100 may move to step 2170. When the RUNNING AVERAGE is equal to or larger than the HEAT TIME LIMIT (YES at 2160), the controller 170 may turn off the heater 146 (at 2164) and forcefully halt the ESD 100" for a period FORCE OFF TIME (at 2166). Then, the value of the FALSE OFF TIME multiplied by the FALL RATE may be subtracted from the RUNNING AVERAGE (at 2168) and the process 2100 may move to step 2170. Accordingly, the controller 170 may execute this process to avoid issues of the sensor being stuck and control the temperature of the heater 146.

Figure 2B:
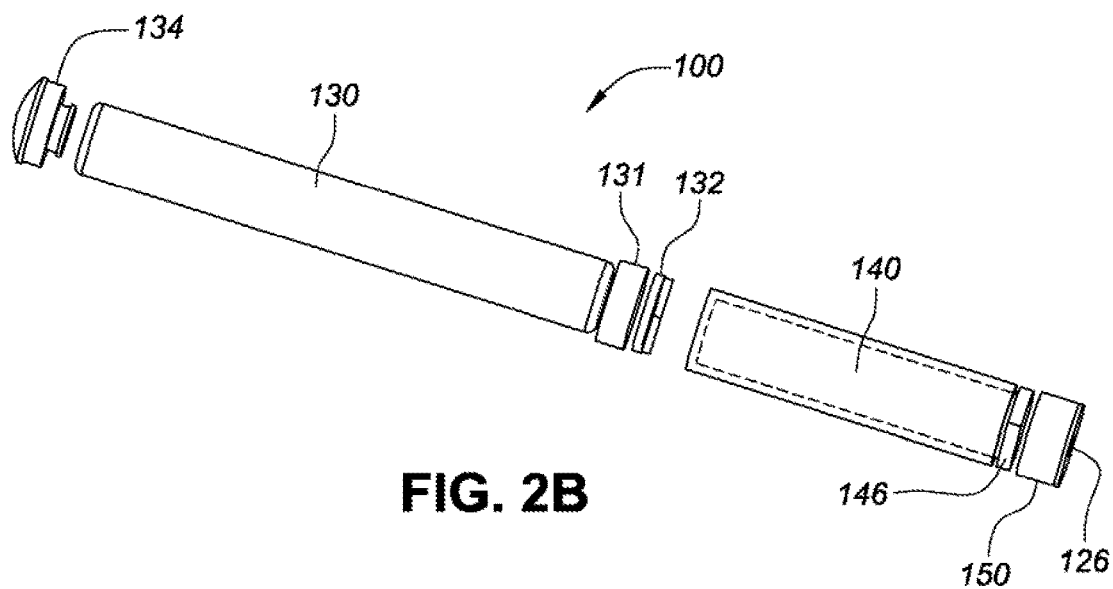
FIG. 2B shows an exploded view of the electronic smoking device shown in FIG. 2A.

FIG. 2A shows a cross-section view of an exemplary design of the ESD 100 shown in FIG. 1, constructed according to the principles of the disclosure. FIG. 2B shows an exploded view of the ESD 100 shown in FIG. 2A. As noted above, the ESD 100 shown in FIGS. 2A and 2B may a single body construction and covered by a single housing 110 such that the ESD 100 may not be accidentally disassembled or broken into pieces. Further, the single body construction may be easier and less costly to design and manufacture. Thus, the single body construction may be more suitable for a disposable ESD.

Referring to FIGS. 2A and 2B concurrently, the housing 100 may have an elongated tubular shape with the LED unit 134 formed at the first end 102 and the smoke outlet 126 formed at the second end 104. The air inlet 120 may extend inwardly from the housing 110 and may be connected to the air flow path 122. The ESD 100 may further include a wall structure 131 in order to completely separate a compartment that contains the battery 130 from the air inlet 120, the air flow path 122, the container 140 and/or the like such that components in each section may be safely sealed off from each other and functions of the components may be isolated from each other. The smoke outlet 126 may be formed at a tip end piece 150. The heater 146 may be fixed by pushing the tip end piece 150 into an opening of the housing 110 at the second end 104.

Figure 3:
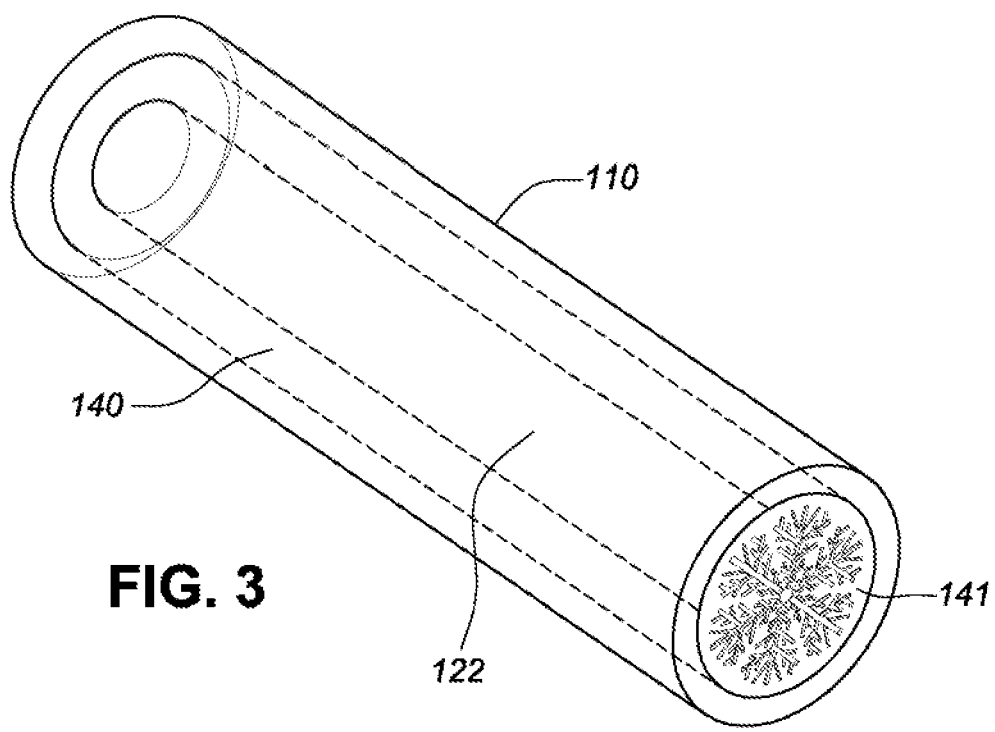
FIG. 3 shows a partial perspective view of an air flow path, a container, a housing and a micromesh screen of the electronic smoking device shown in FIG. 2A, constructed according to the principles of the disclosure.

In one aspect, the container 140 may surround the air flow path 122. More specifically, as shown in FIG. 3, the container 140 may have an elongated tubular shape and be surrounded by the housing 110. The air flow path 122 may extend along the center of the container 140. The air flow path 122 may also have an elongated tubular shape with a smaller diameter. The housing 110, the container 140 and the air flow path 122 may be concentric. As noted above, the air flow path 122 may be connected to the air inlet 120 at one end and the other end may be connected to the vaporizing chamber 124. The container 140 may also be connected to the vaporizing chamber 124. In order to control dispensing of the smoking liquid from the container 140 to the vaporizing chamber 124, the dispensing control device 141 may be formed between the container 140 and the vaporizing chamber 124.

Figure 7A:
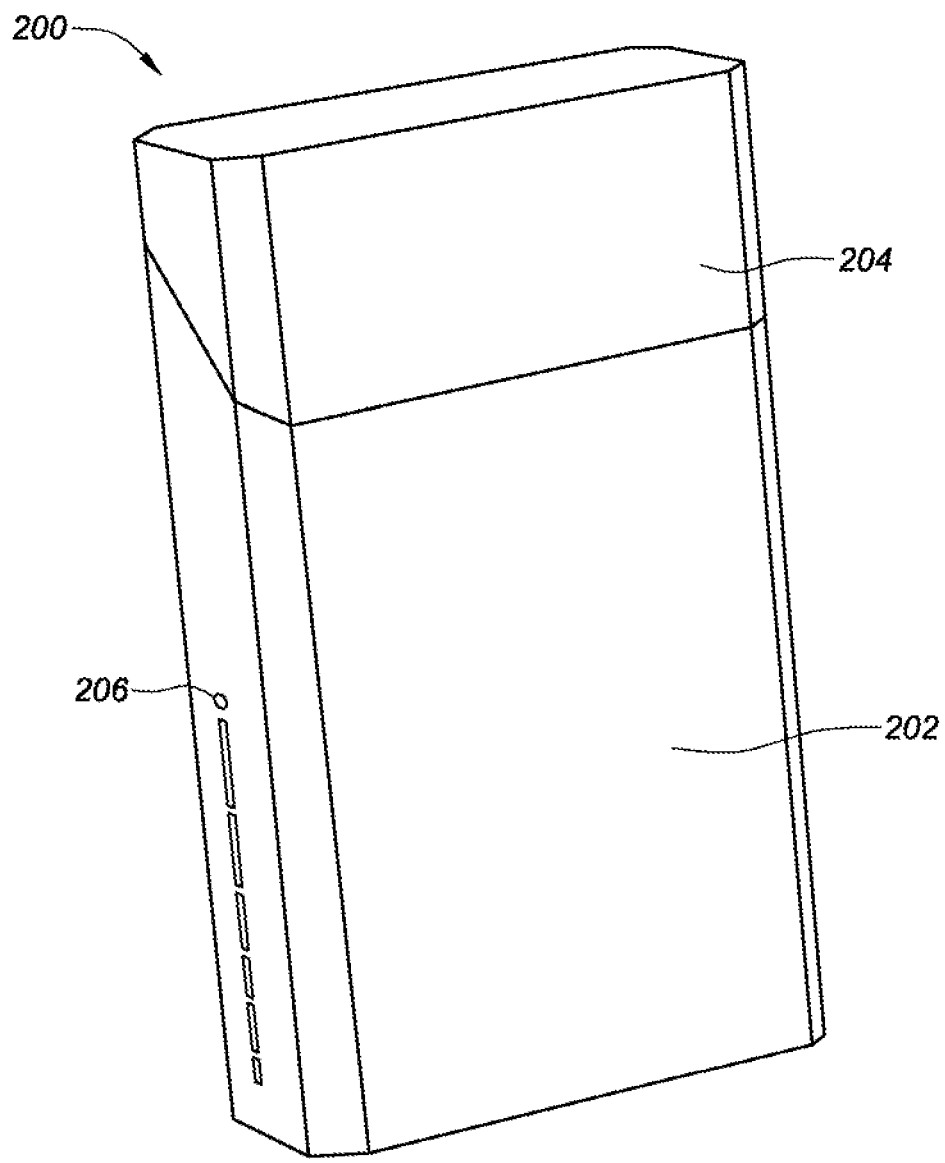
FIG. 7A shows a perspective view of a pack for the electronic smoking device, constructed according to the principles of the disclosure.
Figure 7B:
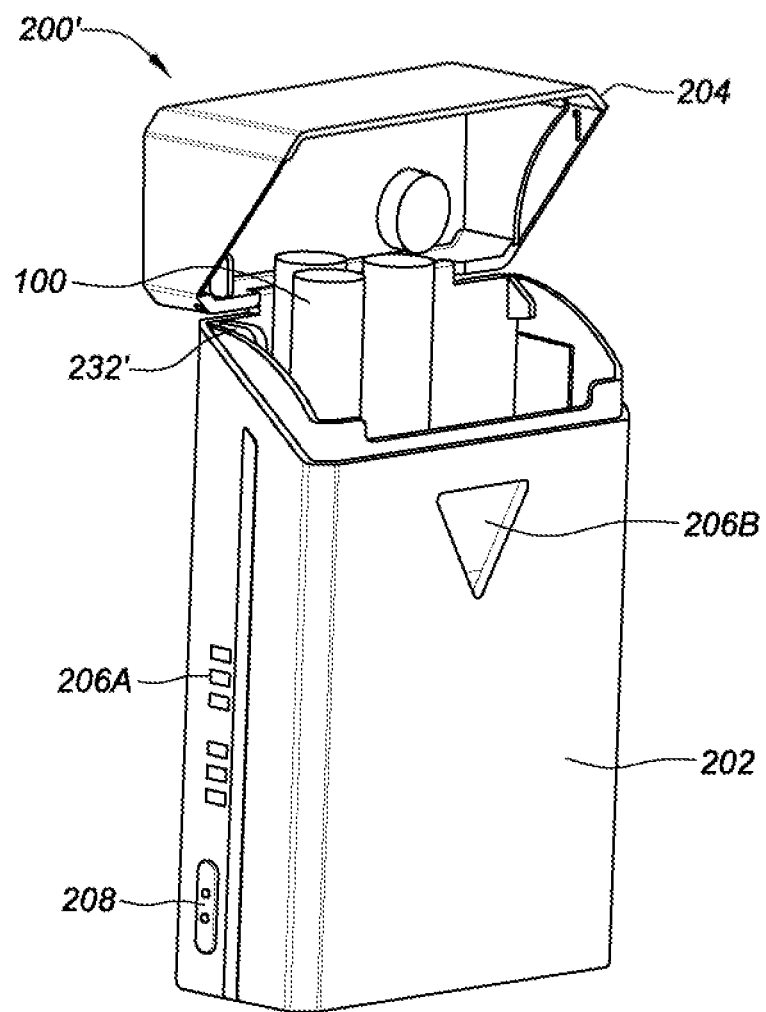
FIG. 7B shows a perspective view of another pack for electronic smoking device, constructed according to the principles of the disclosure.
Figure 7C:
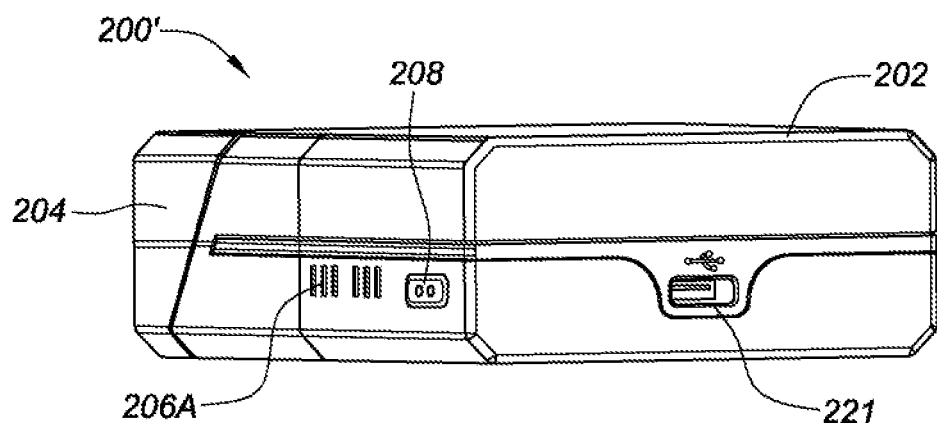
FIG. 7C shows a bottom perspective view of the pack shown in FIG. 7.
Figure 8:
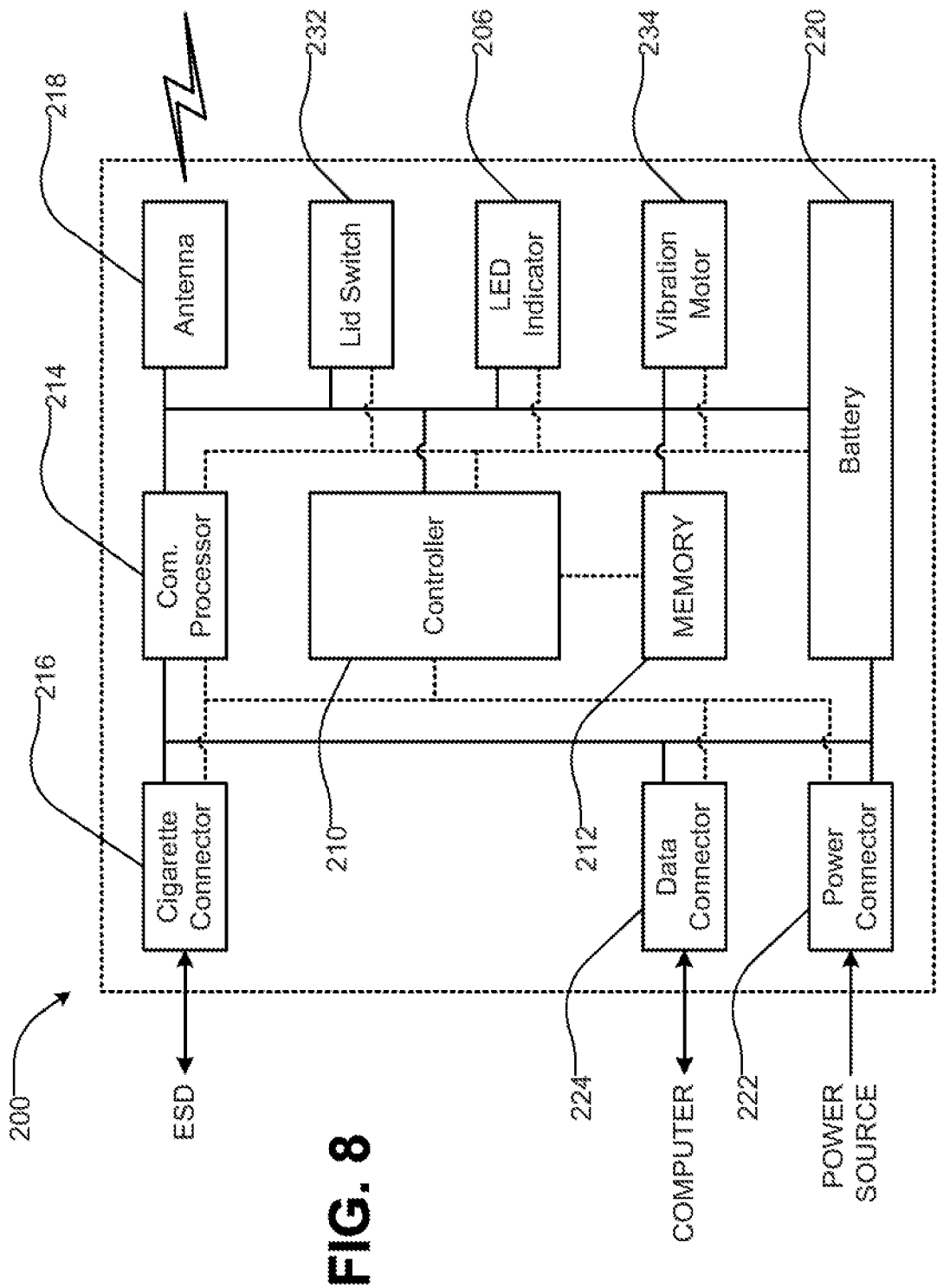
FIG. 8 shows a schematic overview of the pack shown in FIG. 7, constructed according to the principles of the disclosure.

FIG. 7A shows a perspective view of the pack 200 for an ESD, constructed according to the principles of the disclosure. The pack 200 may have a conventional cigarette pack shape but other shapes are also contemplated. FIG. 7B shows a perspective view of another pack 200' and FIG. 7C shows a bottom perspective view of the pack 200' shown in FIG. 7B. FIG. 8 shows a structural overview of the pack 200 of FIG. 7A and the pack 200' of FIGS. 7B and 7C, constructed according to the principles of the disclosure. Referring to FIGS. 7A, 7B, 7C and 8 concurrently, the pack 200 may include a main body 202, a lid 204, one or more user interface devices (e.g., an indication light 206 (in FIG. 7A), 206A and 206B (in FIG. 7B), a switch 208, a vibration motor 234 (shown in FIG. 8), a further display (not shown), a sound device (not shown) and/or the like), one or more connectors (e.g., a cigarette connector 216, a power connector 222, a data connector 224 and/or the like) and/or the like. The pack 200 may further include a controller 210, a memory 212, a communication processor 214, an antenna 218, a battery 220, a lid switch 232, a lid switch plunger 232', and/or the like. The lid switch plunger 232' may be connected to the lid switch 232 and configured to detecting opening and closing of the lid 204.

As noted above, the cigarette connector 216 may be connected to the terminal 162 of the ESD 100 to charge the battery in the power supply unit 130, exchange data with the integrated sensor/controller circuit 132 and/or the like. The terminal 162 and the cigarette connector 216 may be connected by a threaded type connection. Other connection types are also contemplated, including, such as, e.g., a non-threaded type connection, a stationary connection, a push-in (pressing) connection, and/or the like. The power connector 222 may be connected to an external power source (USB, transformer, or the like) to charge the battery 220. Additionally or alternatively, the pack 200 may include a non-contact inductive recharging system such that the pack 200 may be charged without being physically connected to any external power source. The battery 220 and the battery 130 in ESD 100 may be charged at different voltages. Thus, the pack 200 may include multiple internal voltage nets (not shown). The data connector 224 may be connected to, for example, the user's computer 320A, 320B (shown in FIG. 9)

and/or the like to exchange data between the pack 200 and the computer 320A, 320B. The power connector 222 and the data connector 224 may be combined. For example, the pack 200' may include a USB connector 221 (shown in FIG. 7C), a FireWire connector and/or the like, that may function as both the power connector 222 and the data connector 224.

The controller 210 may be configured to control overall operations of the pack 200 including one or more components noted above. For example, the controller 210 may carry out a power saving scheme by, for example, entering a power save mode or the like, when the power connector 222 is disconnected from an external power source and the lid 204 has not been opened for a predetermined period of time. Opening and closing the lid 204 may be detected by the lid switch 232. Also, the controller 210 may detect the battery charge level of the battery 220 in the pack 200 and the battery in the ESD 100 when the ESD 100 is connected to the pack 200. Further, the controller 210 may operate the user interface devices to indicate a status of the ESD 100 and the pack 200. For example, the controller 210 may operate the LED indicator 206 to blink with longer intervals when the ESD 100 is connected to the cigarette connector 216 and being charged by the battery 220 or an external power source. When there is a problem with the ESD 100 or the pack 200, the controller 210 may show an alert message or an error message on the display (not shown), generate an alert sound and/or the like. For example, when the container 140 is empty or the battery charge level is low in the ESD 100, the controller 210 may show a message on the display, activate the vibration motor 234 and/or the like. Further, when the heater 146 is overheating or malfunctioning, the controller 210 may control the LED indicator 206 to blink with shorter intervals, display a heater error message on the display, generate an alert sound and/or the like. In other words, any error detected in the ESD 100 may be transmitted to the pack 200. Further, when the pack 200 is connected to an external device, such as, e.g., computer or the like, an error message may be displayed on the external device.

The communication processor 214 may carry out wired communications via the data connector 224 and/or wireless communications via the antenna 218, which is described below in detail with reference to FIG. 9. The memory 212 may include instructions to be executed by the controller 210 to carry out various operations. The memory 212 may further include usage information (e.g., smoking liquid level in the container 140, how many containers 140 have been consumed, amount of nicotine consumed, and/or the like), product information (e.g., model number, serial number and/or the like), user information (e.g., the user's name, sex, age, address, job, educational background, job, professional background, interests, hobbies, likes and don't—likes and/or the like) and/or the like. The user information may be received from the user's computer 320A, 320B via the data connector 224 or wirelessly via the antenna 218 and stored in the memory 212. Alternatively, the user information may be received by a social network website, such as, e.g., Facebook™, LinkedIn™ Eharmony™ and/or the like, via the data connector 224 or wirelessly via the antenna 218.

The data stored in the pack 200 (e.g., the usage information, the product information, the user information and/or the like) may be shared with other devices and/or entities (e.g., vendors, healthcare service providers, social networks and/or the like). For example, FIG. 9 shows a conceptual overview of a system 300 for exchanging data of the pack 200 over various communication channels, constructed according to the principles of the disclosure. The system 300 may be a network of a plurality of communication devices, such as, e.g., one or more packs 200 (e.g., a first pack 200A owned by a first user 310A, a second pack 200B owned by a second user 310B and/or the like), one or more computers 320 (e.g., a desktop PC 320A, a laptop PC 320B, a mobile phone (not shown), a personal data assistant (PDA) (not shown), a tablet PC (not shown) and/or the like) and/or the like, that are connected to each other via various wired and/or wireless communication channels 360 (e.g., LAN, WAN, Internet, intranet, Wi-Fi network, Bluetooth network, cellular network and/or the like). The user 310 may download and install a software application in her or his computers 320 such that the computer 320 and the pack 200 may exchange data with each other. Further, an app may be installed in the user's smartphone, which may be then connected to the pack 200 directly or via the communication channels 360.

Figure 9:
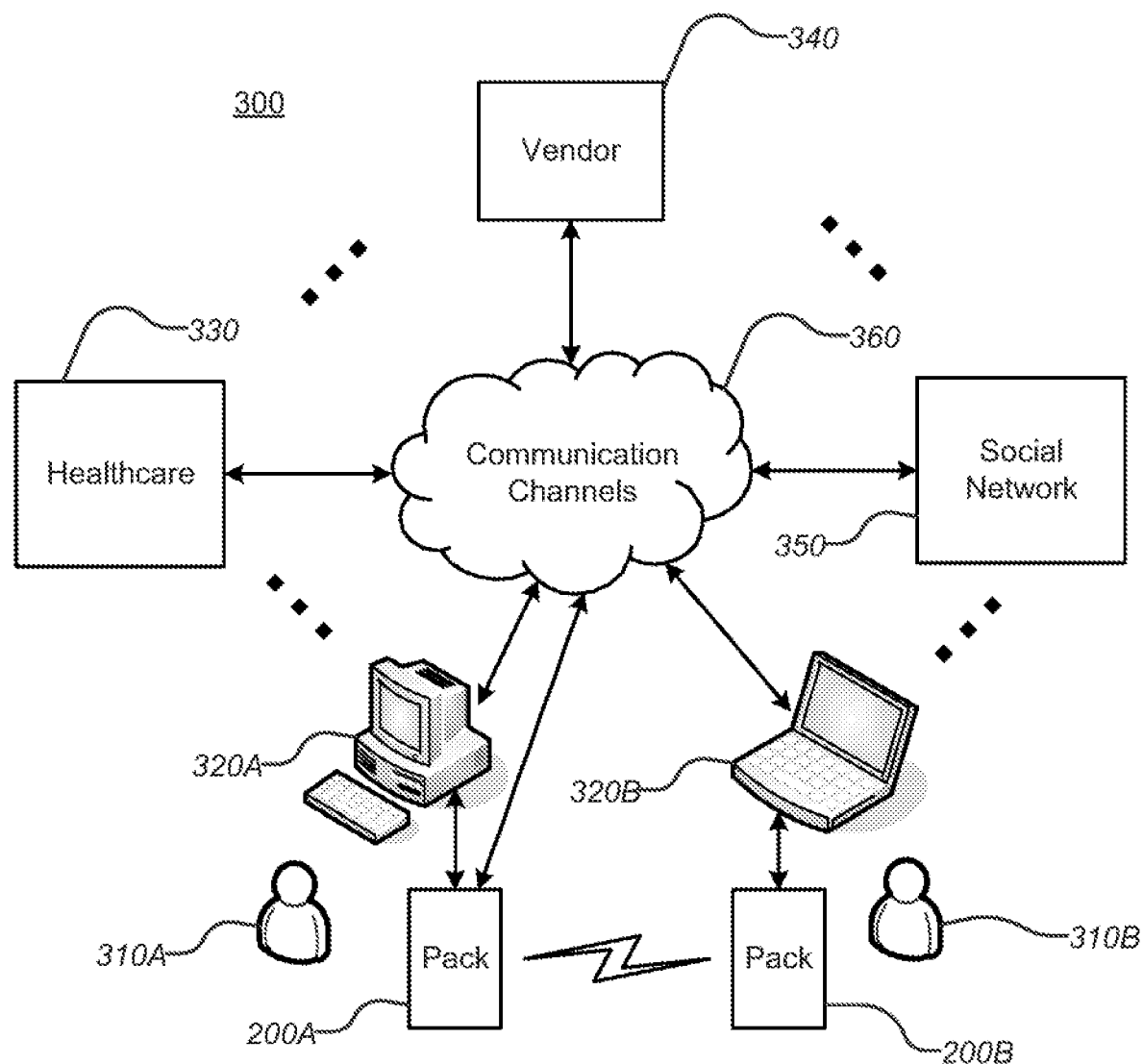
FIG. 9 shows a conceptual overview of a system for exchanging data over various communication channels using the pack shown in FIG. 7, constructed according to the principles of the disclosure.

As shown in FIG. 9, the packs 200A and 200B may communicate directly with each other via the communication processor 214 and the antenna 218. For example, the packs 200A and 200B may exchange the user information with each other. When the users 310A and 310B have the same hobby or graduated from the same school, the controller 210 in each of the packs 200A and 200B may operate the user interface devices to notify the match. For example, the pack 200A may make a sound and/or show a message that the user 310B who graduated from the same school is near by the user 310A on the display. Additionally, a smartphone or a tablet computer running the app noted above may be used to interact with other users. Accordingly, the packs 200A and 200B may be used for social networking devices.

Further, the packs 200A and 200B may be connected directly to the wired and/or wireless communication channels 360 or indirectly via the computers 320A and 320B, respectively. Based on the usage data, the pack 200A may automatically send an order request to the vendor 340 when the user 310A needs more disposable ESDs or a new supply of the second bodies 100B. Further, the packs 200B may send usage data to the healthcare service provider 330, such as, e.g., a physician's office, a hospital and/or the like, such that a physician, a nurse, a hospital staff and/or the like may track and analyze nicotine consumption by the user 310B. The user 310B may also use the usage data to monitor how much she or he smokes and check whether she or he has been smoking less or more for a period time.

Furthermore, the ESD 100 may be susceptible to bacterial growth after a certain period of time. The usage data may be used to determine how long the ESD 100 has been used and automatically disable the ESD 100 when the ESD 100 has been used for a certain period of time and/or severity of the usage.

Figure 10:
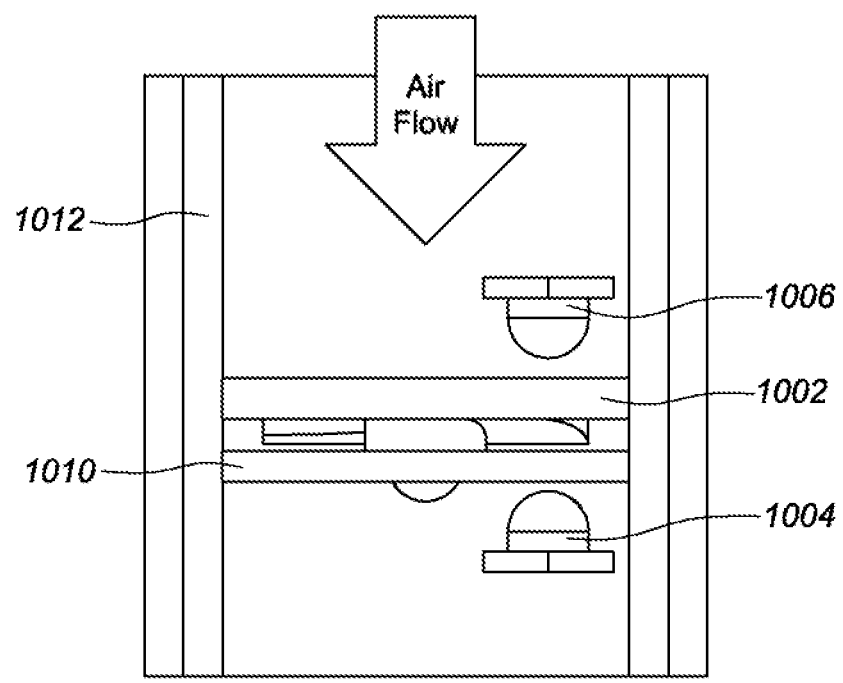
FIGS. 10 and 11 show a schematic of a sensor for the electronic smoking device constructed according to the principles of the disclosure.
Figure 11:
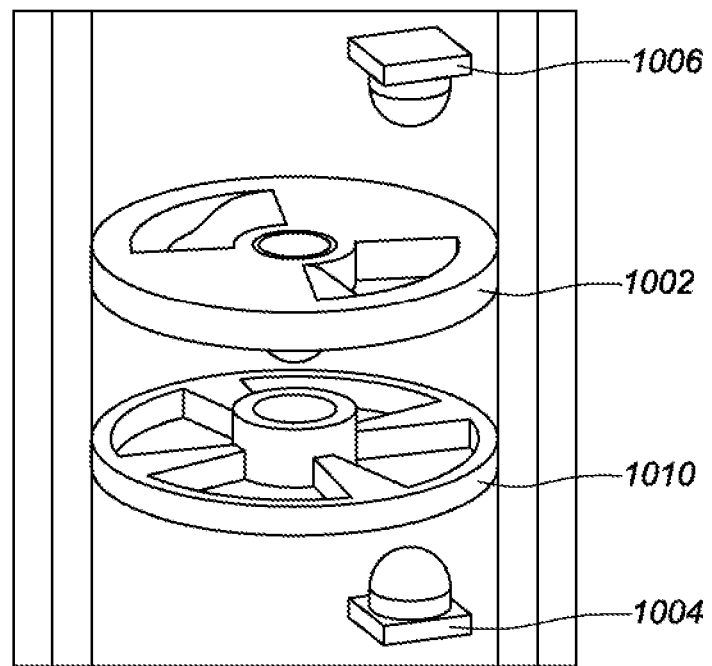

FIGS. 10 and 11 show a schematic of a sensor for the electronic smoking device constructed according to the principles of the disclosure. As shown in FIGS. 10 and 11, the sensor may include an emitter (IR or visible) 1006, detector 1004, rotating disk 1002 with windows, stator 1010, and a holder 1012. The disk 1002 may have slanted windows to convert airflow into rotary thrust. Airflow causes the disk 1002 to spin. The rate of spin corresponds to airflow. The rate of spin may be detected by frequency of light pulses from the emitter device 1006 received by detector 1004. Other embodiments exist where a disk has a reflective surface. The emitter 1006 and detector 1004 are arranged on the same side of the disk 1002. The detector 1004 looks for pulses in reflections from the disk surface as the disk 1002 spins. Other embodiments exists where axis of disk is rotated 90° relative to the air flow, similar to a water wheel.

Figure 12:
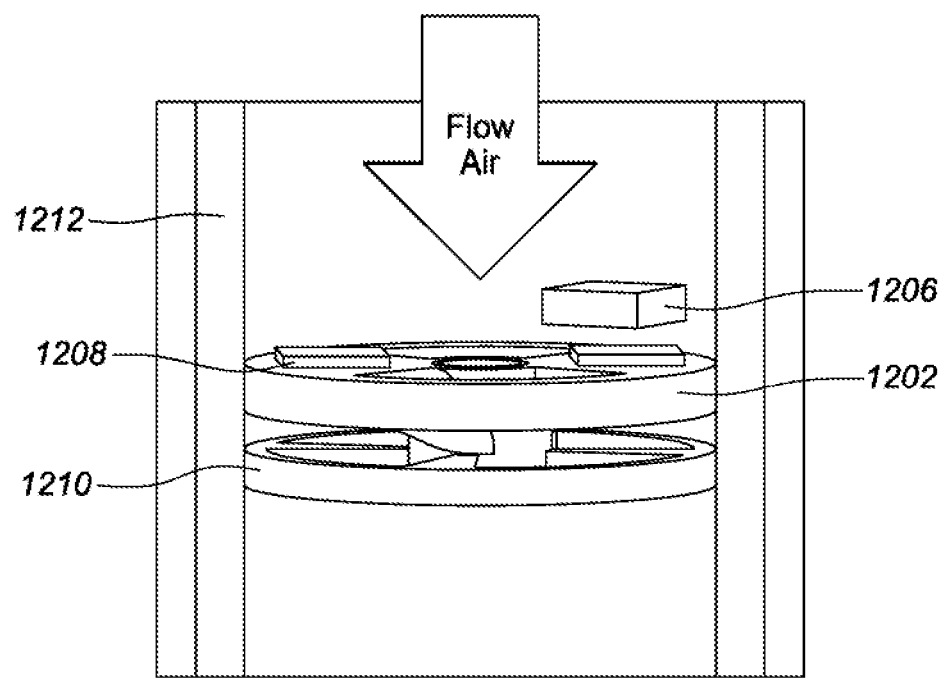
FIGS. 12 and 13 show a schematic of another sensor for the electronic smoking device constructed according to the principles of the disclosure.
Figure 13:
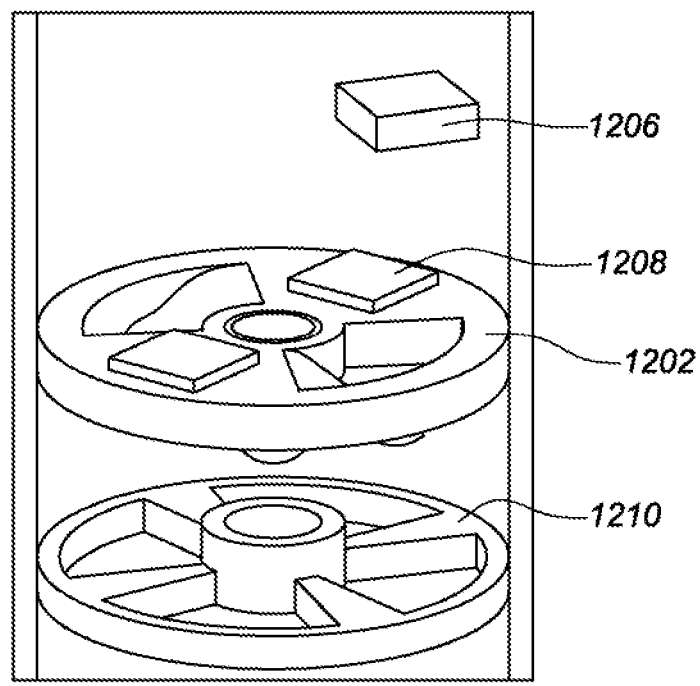

FIGS. 12 and 13 show a schematic of another sensor for the electronic smoking device constructed according to the principles of the disclosure. As shown in FIGS. 12 and 13, a housing 1212 includes a stator 1210 and a disk 1202 that may have slanted windows to convert airflow into rotary thrust. Airflow causes disk 1202 to spin. The rate of spin corresponds to airflow. The rate of spin may be detected by frequency of pulses received by Hall Effect sensor 1206 from magnets 1208. Other embodiments exist where capacitive sensing regions or physical contacts are used instead of Hall Effect sensor 1206 and magnets 1208. Other embodiments exist where electric field can be applied to electromagnet (not shown). The electromagnet will prevent the disk from spinning. This provides the ability to stop airflow if so desired in order to control dosage.

FIGS. 14 and 15 show a schematic of yet another sensor for the electronic smoking device constructed according to the principles of the disclosure. As shown in FIGS. 14 and 15, the sensor includes a housing 1402, plunger with holes 1404 to allow airflow, holder 1407, spring 1406, an emitter (IR or visible) 1408, a detector 1410, and windows 1412 in the plunger 1404. Airflow causes plunger 1404 to compress the spring 1406. The windows 1412 in the plunger 1404 produce "light/no light" condition that can be read by detector 1410. The number of windows corresponds to amount of airflow. This configuration may be used for optical sensors, capacitive sensors, hall-effect sensors and the like.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications, or modifications of the disclosure.

What is claimed is:

1. An electronic smoking device comprising the following:
   a housing including a flow path;
   a compartment within the housing and configured for storing a consumable material;
   a vaporizer positioned in the flow path and configured to receive consumable material from the compartment and generate vapor;
   a sensor configured for determining usage;
   a controller communicatively coupled to the sensor, the controller configured to collect usage data from the sensor and to permanently disable the vaporizer if a total period of time since the vaporizer was first activated is not less than a total time limit.

2. The electronic smoking device of claim 1, wherein the sensor is positioned in the flow path.

3. The electronic smoking device of claim 1, wherein the consumable material is a liquid.

4. The electronic smoking device of claim 1, wherein the sensor is configured to detect a flow of air in the flow path.

5. The electronic smoking device of claim 1, wherein the sensor is configured to detect the rate of flow of air in the flow path.

6. The electronic smoking device of claim 1, wherein the controller includes circuitry configured to determine how long the vaporizer has been active in a recent time interval.

7. The electronic smoking device of claim 1, wherein the controller includes circuitry configured to determine how long the vaporizer has been active in total.

8. The electronic smoking device of claim 1, wherein the controller includes circuitry configured to determine the period of time since the vaporizer was first activated.

9. The electronic smoking device of claim 1, further comprising a user interface device that is configured to indicate whether the vaporizer has been disabled.

10. The electronic smoking device of claim 9, wherein the user interface device is configured to indicate at least one status selected from a list consisting of:
    1) the consumable material in the compartment is near depleted;
    2) the charge level of a battery powering the electronic smoking device is low;
    3) a battery powering the electronic smoking device is being charged;
    4) wherein the vaporizer includes a heater, and the heater is malfunctioning;
    5) the vaporizer has been temporarily disabled; and
    6) the vaporizer has been permanently disabled.

11. An electronic smoking device comprising the following:
    a housing including a flow path;
    a compartment within the housing and configured for storing a consumable material;
    a vaporizer positioned in the flow path and configured to receive consumable material from the compartment and generate vapor;
    a sensor configured for determining usage;
    a controller communicatively coupled to the sensor, the controller including controller circuitry configured to collect usage data from the sensor and disable the vaporizer, the controller circuitry selected from at least one of a list consisting of:
    1) controller circuitry configured to disable the vaporizer permanently if a total period of time since the vaporizer was first activated is not less than a total time limit;
    2) controller circuitry configured to disable the vaporizer permanently if a cumulative usage of the vaporizer is not less than a predetermined cumulative usage limit; and
    3) controller circuitry configured to disable the vaporizer permanently if a cumulative activation time of the vaporizer is not less than a predetermined cumulative activation time limit.

12. The electronic smoking device of claim 11, wherein the sensor is positioned in the flow path.

13. The electronic smoking device of claim 11, wherein the consumable material is a liquid.

14. The electronic smoking device of claim 11, wherein the sensor is configured to detect a flow of air in the flow path.

15. The electronic smoking device of claim 11, wherein the sensor is configured to detect the rate of flow of air in the flow path.

16. A method of disabling an electronic smoking device, the method comprising the steps of:
    operating the electronic smoking device, wherein the electronic smoking device includes a housing including a flow path, a compartment within the housing and configured for storing a consumable material, a vaporizer positioned in the flow path and configured to receive consumable material from the compartment and generate vapor, a sensor configured for determining usage, and a controller communicatively coupled to the sensor, the controller including controller circuitry configured to collect usage data from the sensor and disable the vaporizer; the controller circuitry selected from a list consisting of 1) controller circuitry configured to disable the vaporizer permanently if a total period of time since the vaporizer was first activated is not less than a total time limit, 2) controller circuitry configured to disable the vaporizer permanently if a cumulative usage of the vaporizer is not less than a predetermined cumulative usage limit, and 3) controller circuitry configured to disable the vaporizer permanently if a cumulative activation time of the vaporizer is not less than a predetermined cumulative activation time limit.

\* \* \* \* \*